US012212104B1

(12) United States Patent
Zeng et al.

(10) Patent No.: US 12,212,104 B1
(45) Date of Patent: Jan. 28, 2025

(54) CONVERSION AND CONDUCTION STRUCTURE FOR POWER CONVERTER

(71) Applicants: Guangli Zeng, Guangdong (CN); Chengbing Wang, Guangdong (CN); Feng Wang, Guangdong (CN)

(72) Inventors: Guangli Zeng, Guangdong (CN); Chengbing Wang, Guangdong (CN); Feng Wang, Guangdong (CN)

( * ) Notice: Subject to any disclaimer, the term of this patent is extended or adjusted under 35 U.S.C. 154(b) by 0 days.

(21) Appl. No.: 18/792,943

(22) Filed: Aug. 2, 2024

(30) Foreign Application Priority Data

| | | |
|---|---|---|
| Sep. 15, 2023 | (CN) | 202322521688.5 |
| Dec. 13, 2023 | (CN) | 202311715438.3 |
| May 31, 2024 | (CN) | 202410697026.X |

(51) Int. Cl.
*H01R 31/06* (2006.01)
*H01R 13/713* (2006.01)

(52) U.S. Cl.
CPC ......... *H01R 31/065* (2013.01); *H01R 13/713* (2013.01)

(58) Field of Classification Search
CPC ............................ H01R 31/065; H01R 13/713
See application file for complete search history.

(56) References Cited

U.S. PATENT DOCUMENTS

2022/0337009 A1* 10/2022 Zeng .................... H01R 13/629

FOREIGN PATENT DOCUMENTS

CN 102124613 A * 7/2011 ......... H01R 13/4534
CN 106058550 A * 10/2016 ........... H01R 13/453

* cited by examiner

*Primary Examiner* — Travis S Chambers

(57) ABSTRACT

The present utility model discloses a conversion and conduction structure for a power converter, comprising the power converter including an upper cover of a main body, a lower cover of the main body, a bracket, a UK-standard pin assembly, a US-standard pin assembly, a hybrid plug assembly of the type CEE7/7, a CN-standard or an AU-standard pin assembly; Plugs in different countries are correspondingly connected in conduction with pins of different national specifications, especially ground wires in plugs in different countries are connected in conduction with pins of ground wires of different national specifications, thereby improving the safety of the power converter.

8 Claims, 19 Drawing Sheets

CONVERSION AND CONDUCTION STRUCTURE FOR POWER CONVERTER

CROSS REFERENCE TO RELATED APPLICATION

This application claims priority benefit of Chinese patent Application No. 202322521688.5, filed on Sep. 15, 2023, No. 202311715438.3, filed on Dec. 13, 2023, No. 202410697026. X, filed on May 31, 2024, and the entire contents of which are incorporated herein by reference.

TECHNICAL FIELD

The utility model relates to the technical field of power converters, in particular to a conversion and conduction structure for a power converter.

BACKGROUND ART

Since the standards for the sockets in each country are not completely uniform, a plug cannot be universally used all over the world. When people go to different countries, it is necessary to configure a plug corresponding to the country so as to supply power for portable electronic devices. If going to several countries at a time, consumers have to take power plugs corresponding to several countries, which causes great trouble for people who travel across countries or have a business travel.

As a result, multi-country power plugs are commonly available on the market that can be adapted to different national socket standards. It is disclosed in Chinese patent for invention (Patent No: 201010183801.8) that a plurality of pins of different specifications are grouped on the same power converter. However, the two groups of pins, American (US) pins and Australian (AU) pins, have only two legs, i. e. without ground wire pins. Although this power converter reduces the internal volume when reducing the number of legs, it has the risk of electric shock and leakage when used in high-power electrical appliances, which has low safety and does not meet the safety standards.

If ground wire pins are provided, the internal conduction structure is more complicated and more bulky, which is inconvenient for people to use in the travel.

SUMMARY OF THE UTILITY MODEL

In view of the above-mentioned deficiencies, the object of the present utility model is to provide a conversion and conduction structure for a power converter, which is simple in structure and is stable in conduction. Plugs in different countries are correspondingly connected in conduction with pins of different national specifications, especially ground wires in plugs in different countries are connected in conduction with pins of ground wires of different national specifications, thereby improving the safety of the power converter.

The technical solution adopted by the utility model to achieve the above purpose is a conversion and conduction structure for a power converter, comprising:

a power converter comprising an upper cover of a main body, a lower cover of the main body covered with the upper cover of the main body, a bracket disposed inside the upper cover of the main body, a UK-standard pin assembly disposed between the lower cover of the main body and the upper cover of the main body, a US-standard pin assembly, a hybrid plug assembly of a type CEE7/7, and a CN-standard or an AU-standard pin assembly; a socket hole is disposed on the upper cover of the main body; wherein the power converter further comprises a conduction mechanism disposed on the bracket and extending downwards to respectively match the UK-standard pin assembly, the US-standard pin assembly, the hybrid plug assembly of the type CEE7/7, and the CN-standard or AU-standard pin assembly, wherein the conduction mechanism comprises a ground wire (PE) conduction assembly disposed on the bracket and matching the socket hole, a neutral wire (N) conduction assembly disposed on a side of the bracket and matching the socket hole, and a live wire (L) conduction assembly disposed on a side of the bracket and matching the socket hole;

the ground wire (PE) conduction assembly comprises a socket ground wire guide on the bracket, wherein the socket ground wire guide comprises an UK-standard insertion-hole ground wire clamping portion, a CN-standard or an AU-standard insertion-hole ground wire clamping portion and a US-standard insertion-hole ground wire clamping portion;

the live wire (L) conduction assembly comprises a socket live wire guide on a side of the bracket; the socket live wire guide comprises a US-standard insertion-hole live wire conduction piece, a second live wire substrate, an UK-standard insertion-hole live wire conduction piece, and a CN-standard or an AU-standard insertion-hole live wire conduction piece;

the neutral wire (N) conduction assembly comprises a socket neutral wire guide arranged on the other side of the bracket, wherein the socket neutral wire guide comprises a US-standard insertion-hole neutral wire guide, a UK-standard insertion-hole neutral wire guide and a CN-standard or an AU-standard insertion-hole neutral wire conduction piece.

As a further improvement of the present utility model, the US-standard pin assembly comprises a US-standard connector, a US-standard key piece connected to the US-standard connector, a US-standard ground wire pin installed in the US-standard connector and extending downwards, a US-standard ground wire guide disposed at the top of the US-standard ground wire pin and extending downwards in a bending manner, a US-standard neutral wire pin disposed in the US-standard connector and extending downwards, a US-standard neutral wire guide disposed at the top of the US-standard neutral wire pin and extending downwards in a bending manner, a US-standard live wire pin disposed in the US-standard connector and extending downwards, and a US-standard live wire guide disposed at the top of the US-standard live wire pin and extending downwards in a bending manner; the UK-standard pin assembly comprises a UK-standard connector, a UK-standard key piece connected to the UK-standard connector, a UK-standard ground wire pin installed in the UK-standard connector and extending downwards, a UK-standard ground wire guide disposed at the top of the UK-standard ground wire pin and extending downwards in a bending manner, a UK-standard neutral wire pin disposed in the UK-standard connector and extending downwards in a bending manner, a UK-standard neutral wire guide disposed at the top of the UK-standard neutral wire pin and extending downwards in a bending manner, a UK-standard neutral wire guide disposed in the UK-standard connector and extending downwards in a bending manner, and an UK-standard live wire guide disposed at the top of the UK-standard live wire pin and extending downwards in a bending manner; the hybrid plug assembly of the type CEE7/7 comprises a hybrid plug connector, a hybrid plug key piece connected to the hybrid plug connector, a hybrid plug sleeve linked with the hybrid plug key piece, and a hybrid plug bracket disposed to match the hybrid plug connector, wherein the hybrid plug bracket comprises a hybrid plug live wire pin extending downwards, a hybrid plug live wire guide disposed at the top of the hybrid plug live wire pin and extending downwards in a bending manner, a hybrid plug neutral wire pin disposed at the other side of the hybrid plug and extending downwards, a hybrid plug neutral wire guide disposed at the top of the hybrid plug neutral wire pin and extending downwards, and a hybrid plug ground wire guide with one end sheathed in the hybrid plug sleeve; and the CN-standard or AU-standard pin assembly comprises a CN-standard or an AU-standard connector, a CN-standard or an AU-standard key piece connected to the CN-standard or AU-standard connector, a CN-standard or an AU-standard ground wire pin installed in the CN-standard or AU-standard connector and extending downwards, a CN-standard or an AU-standard ground guide disposed at the top of the CN-standard or AU-standard ground wire pin and extending downwards, a CN-standard or an AU-standard neutral wire pin disposed in the CN-standard or AU-standard connector and extending downwards, a CN-standard or an AU-standard neutral wire guide disposed at the top of the CN-standard or AU-standard neutral wire pin and extending downwards in a bending manner, a CN-standard or an AU-standard live wire pin disposed in the CN-standard or AU-standard connector and extending downwards, and a CN-standard or an AU-standard live wire guide disposed at the top of the CN-standard or AU-standard live wire pin and extending downwards in a bending manner.

As a further improvement of the present utility model, the ground wire (PE) conduction assembly further comprises a ground wire lower connecting guide at one end of the socket ground wire guide, a pin ground wire fixing guide with one end connected to a tail end of the ground wire lower connecting guide and extending in a bending manner, and a hybrid plug ground wire fixing guide with one end bent and extended in the direction of the lower cover of the main body; and a hybrid plug ground wire clamping portion is formed at one end of the hybrid plug ground wire fixing guide close to the lower cover of the main body, and the hybrid plug ground wire guide is correspondingly inserted into the hybrid plug ground wire clamping portion.

As a further improvement of the present utility model, the pin ground wire fixing guide comprises a ground wire connecting and clamping portion for clamping the tail end of the ground wire lower connecting guide, a US-standard ground wire clamping portion disposed on one side of the ground wire connecting and clamping portion and clamping the US-standard ground wire guide, a pin ground wire connecting piece disposed on the other side of the US-standard ground wire clamping portion, a UK-standard ground wire clamping portion disposed on one side of the pin ground wire connecting and clamping portion and clamping the UK-standard ground wire guide, and a CN-standard or an AU-standard ground wire clamping portion disposed on one side of the UK-standard ground wire clamping portion and clamping the CN-standard or AU-standard ground wire guide.

As a further improvement of the present utility model, the neutral wire (N) conduction assembly further comprises a socket neutral wire guide disposed at one side of the bracket, and a neutral wire lower connecting piece integrally perpendicular to the lower cover of the main body and connected to the socket neutral wire guide.

As a further improvement of the present utility model, the pin neutral wire fixing guide comprises an US-standard neutral wire clamping portion capable of clamping the US-standard neutral wire guide, an UK-standard neutral wire clamping portion capable of clamping the UK-standard neutral wire guide, a CN-standard or an AU-standard neutral wire clamping portion capable of clamping the CN-standard or AU-standard neutral wire guide, and a hybrid plug neutral wire clamping portion capable of clamping the hybrid plug neutral wire guide.

As a further improvement of the present utility model, the live wire (L) conduction assembly comprises a fuse tube disposed on the lower cover of the main body, a live wire lower connecting piece with the top end connected to the socket live wire guide and the tail end conducting with the fuse tube, and a pin live wire fixing guide conducting with the lower end of the fuse tube, and one side of the pin live wire fixing guide has a hybrid plug live wire fixing guide extending to the side edge of the hybrid plug sleeve facing the hybrid plug live wire guide.

As a further improvement of the present utility model, the pin live wire fixing guide comprises a fuse tube clamping portion for clamping the tail end of the fuse tube, an UK-standard live wire clamping portion extending in the direction of the hybrid plug assembly of the type CEE7/7 and capable of clamping the UK-standard live wire guide, a live wire extension piece connected to the fuse tube clamping portion, a CN-standard or an AU-standard live wire clamping portion disposed on the live wire extension piece and capable of clamping the CN-standard or AU-standard live wire guide, and a US-standard live wire clamping portion capable of clamping the US-standard live wire guide; and the hybrid plug live wire fixing guide is arranged at one end of the pin live wire fixing guide close to an UK-standard live wire clamping portion, and the hybrid plug live wire fixing guide close to one end of the hybrid plug assembly of the type CEE7/7 is formed with a hybrid plug live wire clamping portion capable of clamping the hybrid plug live wire guide.

The utility model has the following beneficial effects.

The ground wire (PE), neutral wire (N), and live wire (L) conduction assemblies are configured to mate with the socket holes so that a multi-country plug inserted into the socket holes may be connected to or disconnected from the UK-standard pin assembly, the US-standard pin assembly, the hybrid plug assembly of the type CEE7/7, and the CN-standard or AU-standard pin assembly. The ground wire (PE), neutral wire (N) and live wire (L) conduction assemblies are simple in structure and stable in connection when conducting, and are particularly suitable for a power converter installed with a hybrid plug of the type CEE7/7, thereby improving the safety of the power converter.

The above mentioned is an overview of the technical scheme of the utility model. The following is a further explanation of the utility model in combination with the attached drawings and specific implementations.

Figure 1:
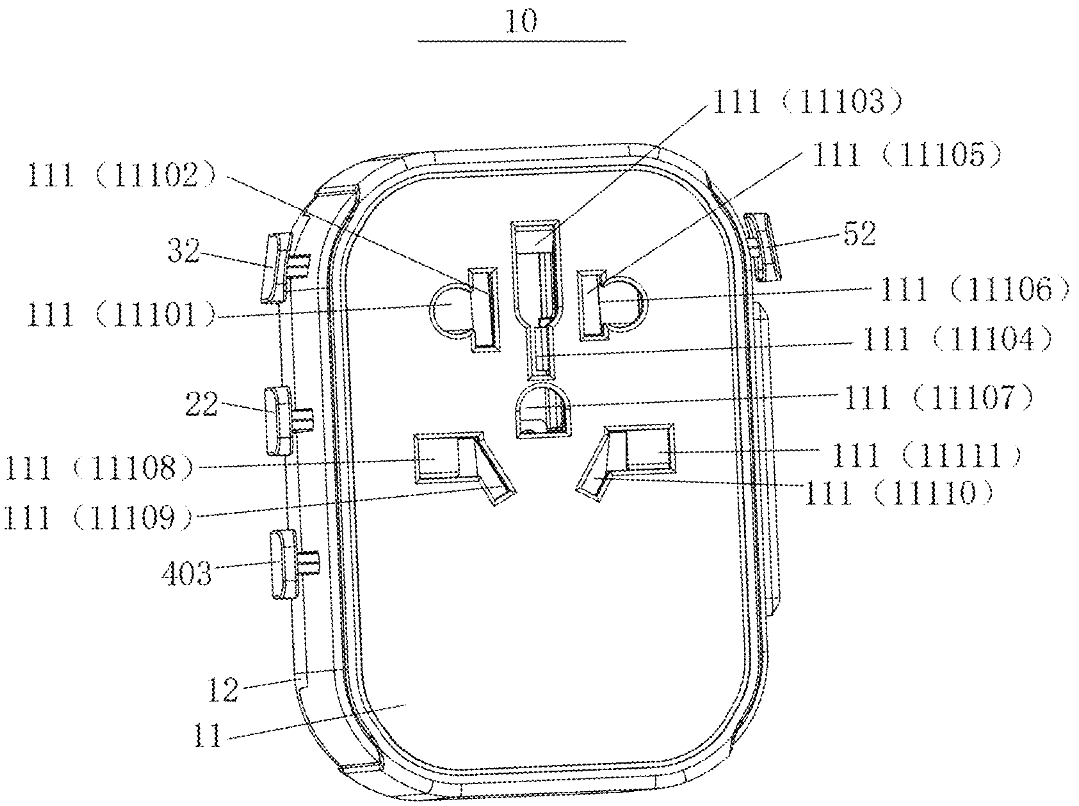
FIG. 1 is a schematic front view of the present utility model.
Figure 2:
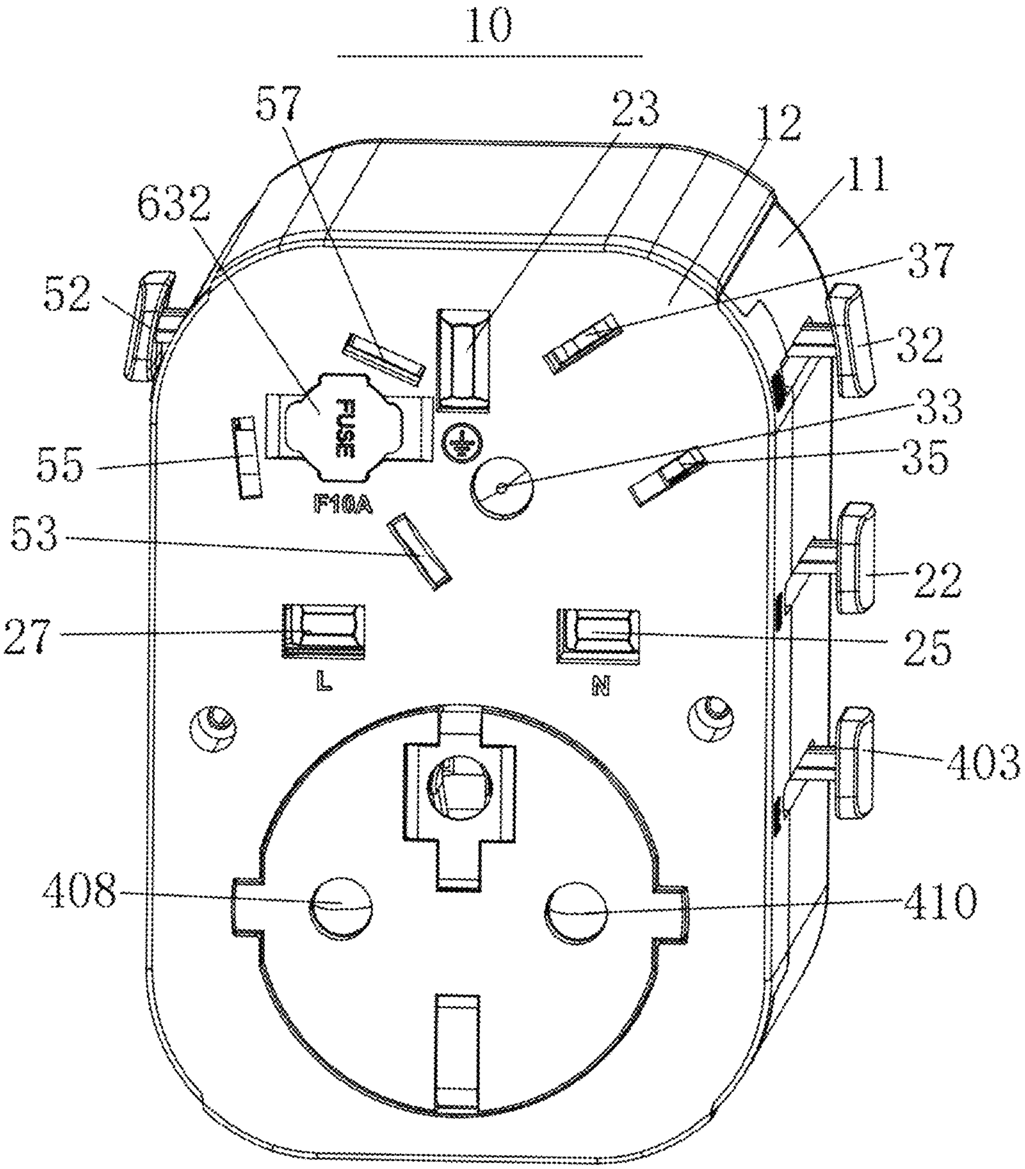
FIG. 2 is a schematic view of the back of the present utility model.
Figure 3:
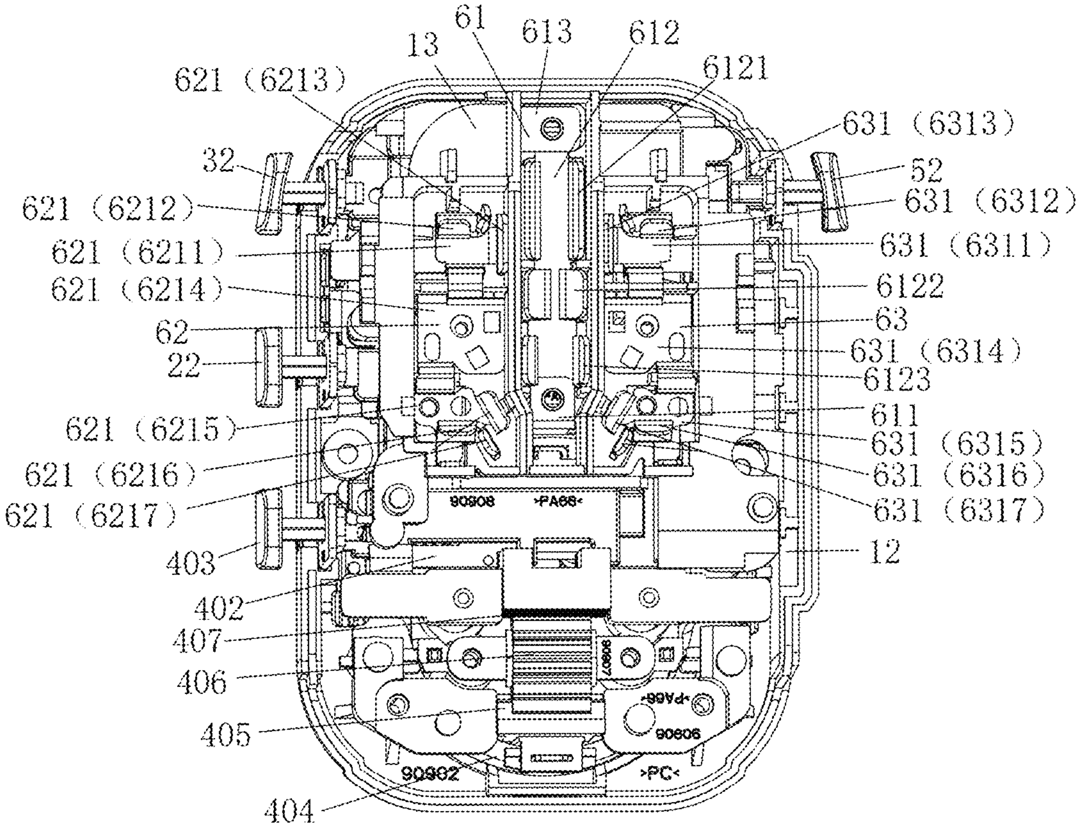
FIG. 3 is an internal schematic view of the present utility model.
Figure 4:
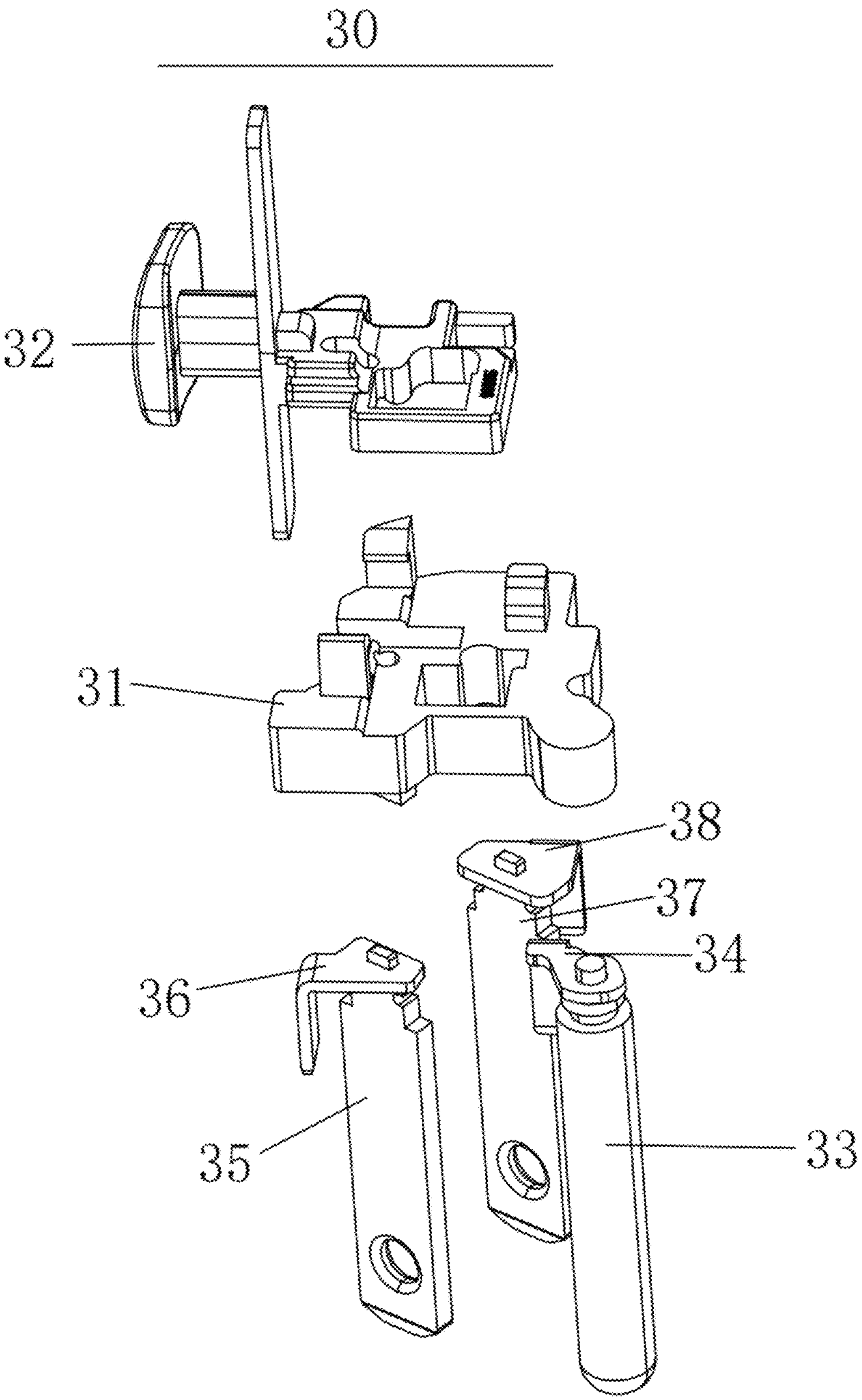
FIG. 4 is an exploded view of a US-standard pin assembly.
Figure 5:
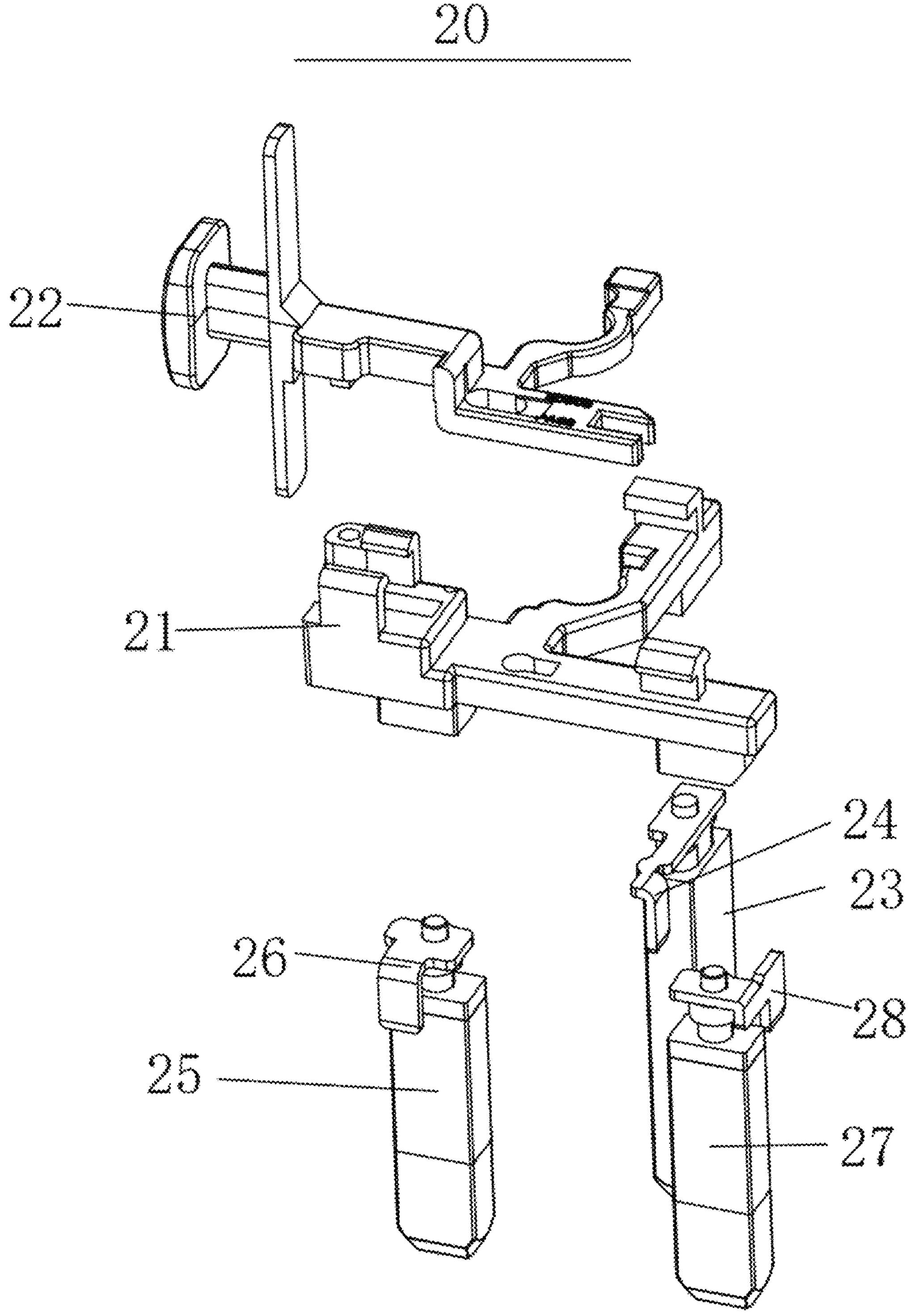
FIG. 5 is an exploded view of a UK-standard pin assembly.
Figure 6:
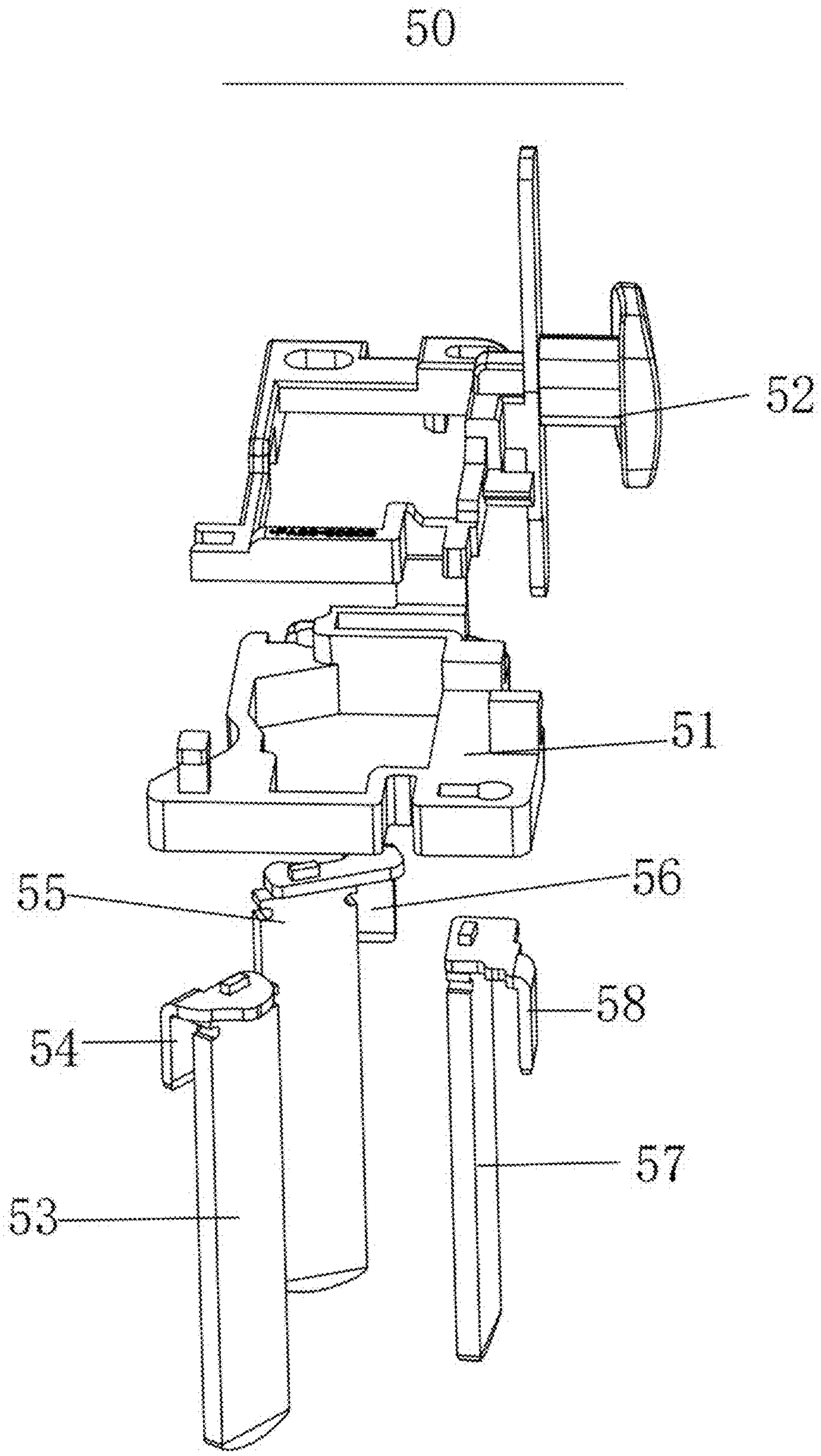
FIG. 6 is an exploded view of a CN-standard or an AU-standard pin assembly.
Figure 7:
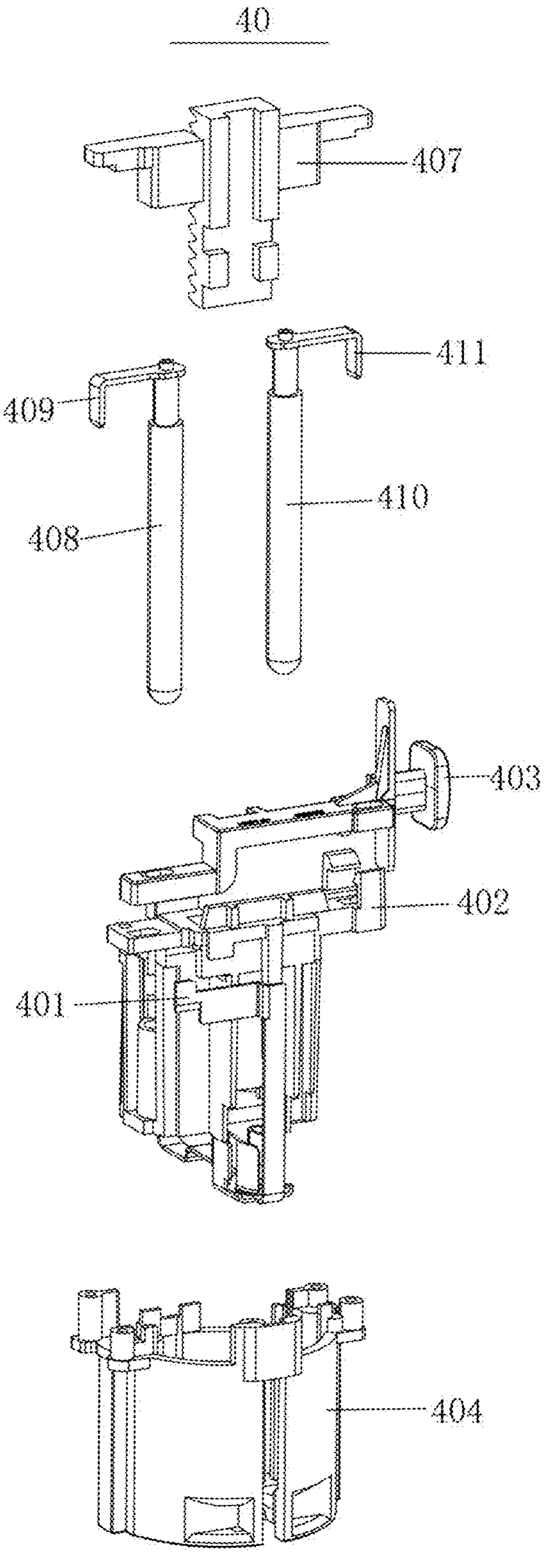
FIG. 7 is an exploded view of a hybrid plug assembly of the type CEE7/7.
Figure 8:
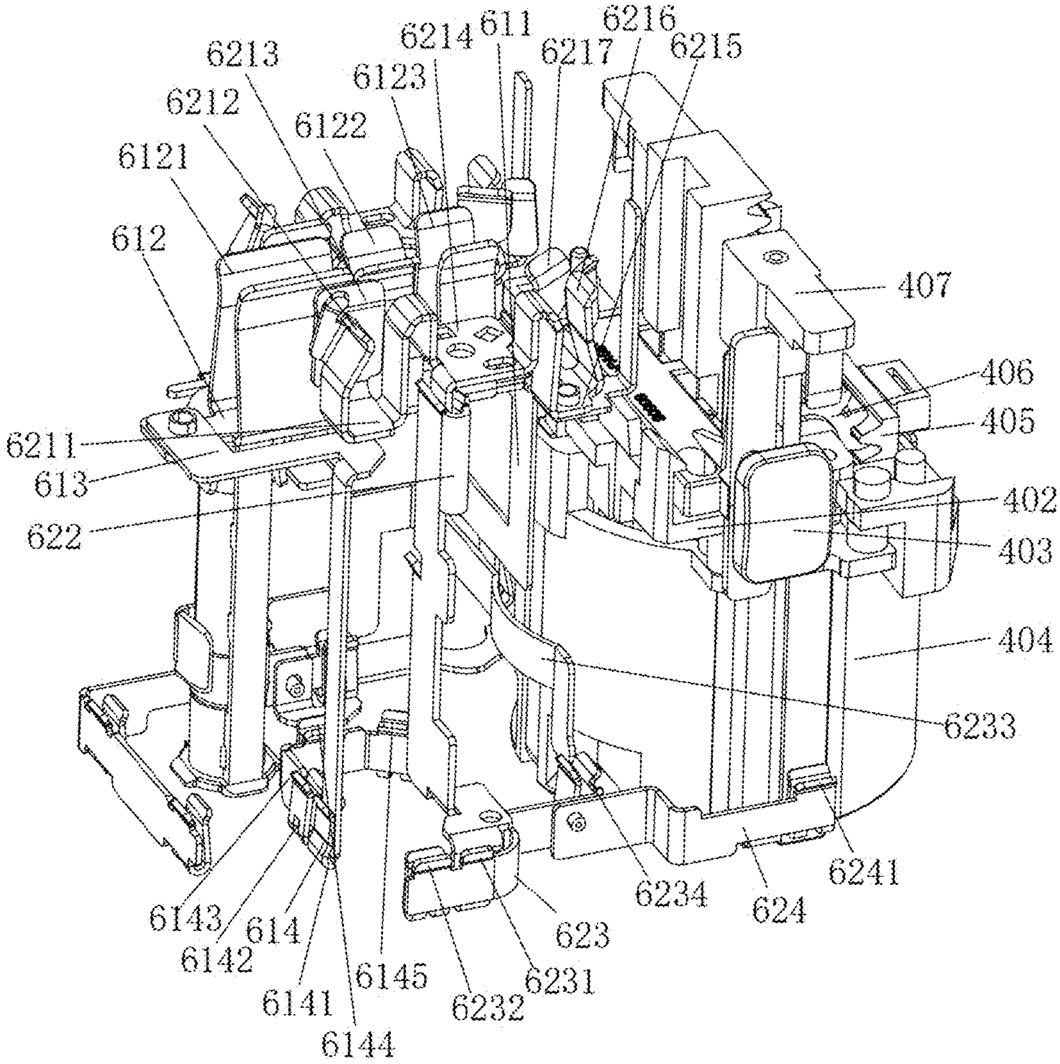
FIG. 8 is a structurally schematic side view of the interior after removal of the bracket.
Figure 9:
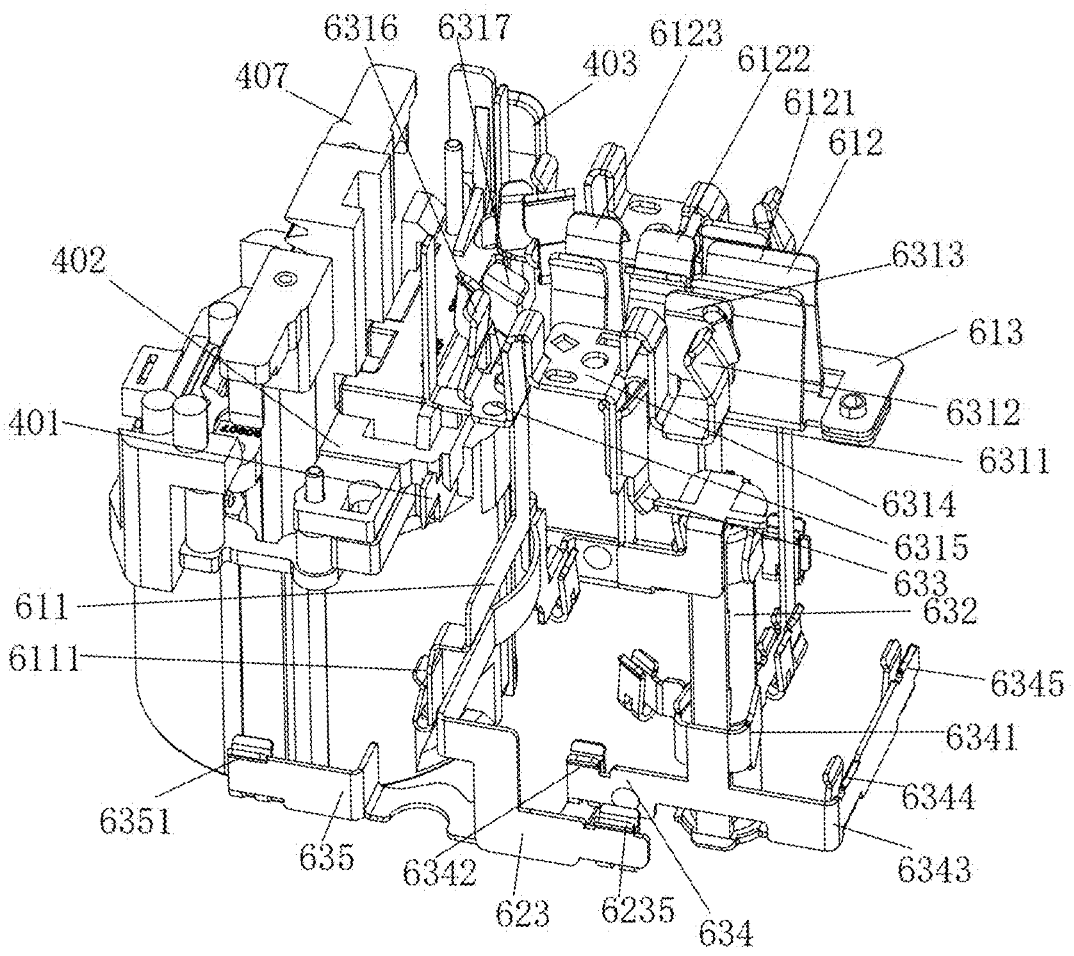
FIG. 9 is another structurally schematic side view of the interior after removal of the bracket.
Figure 10:
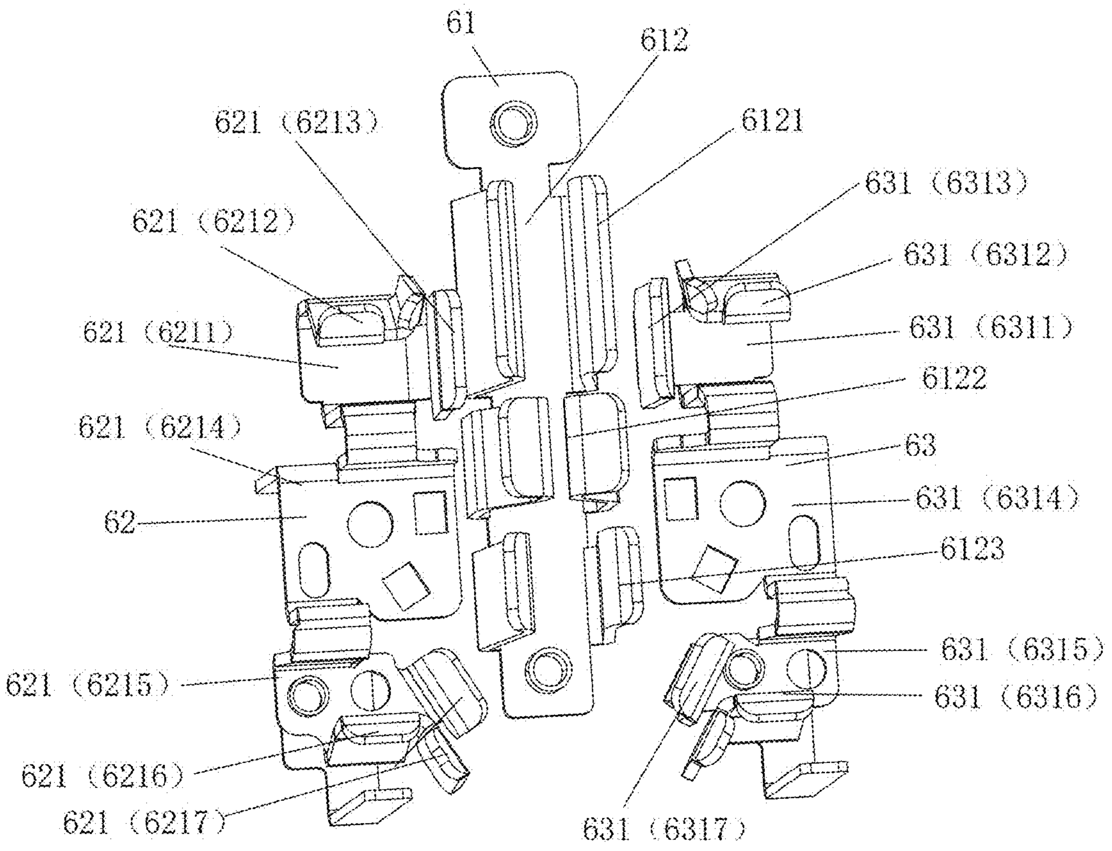
FIG. 10 is a structurally schematic view of an upper structure of a conduction mechanism.
Figure 11:
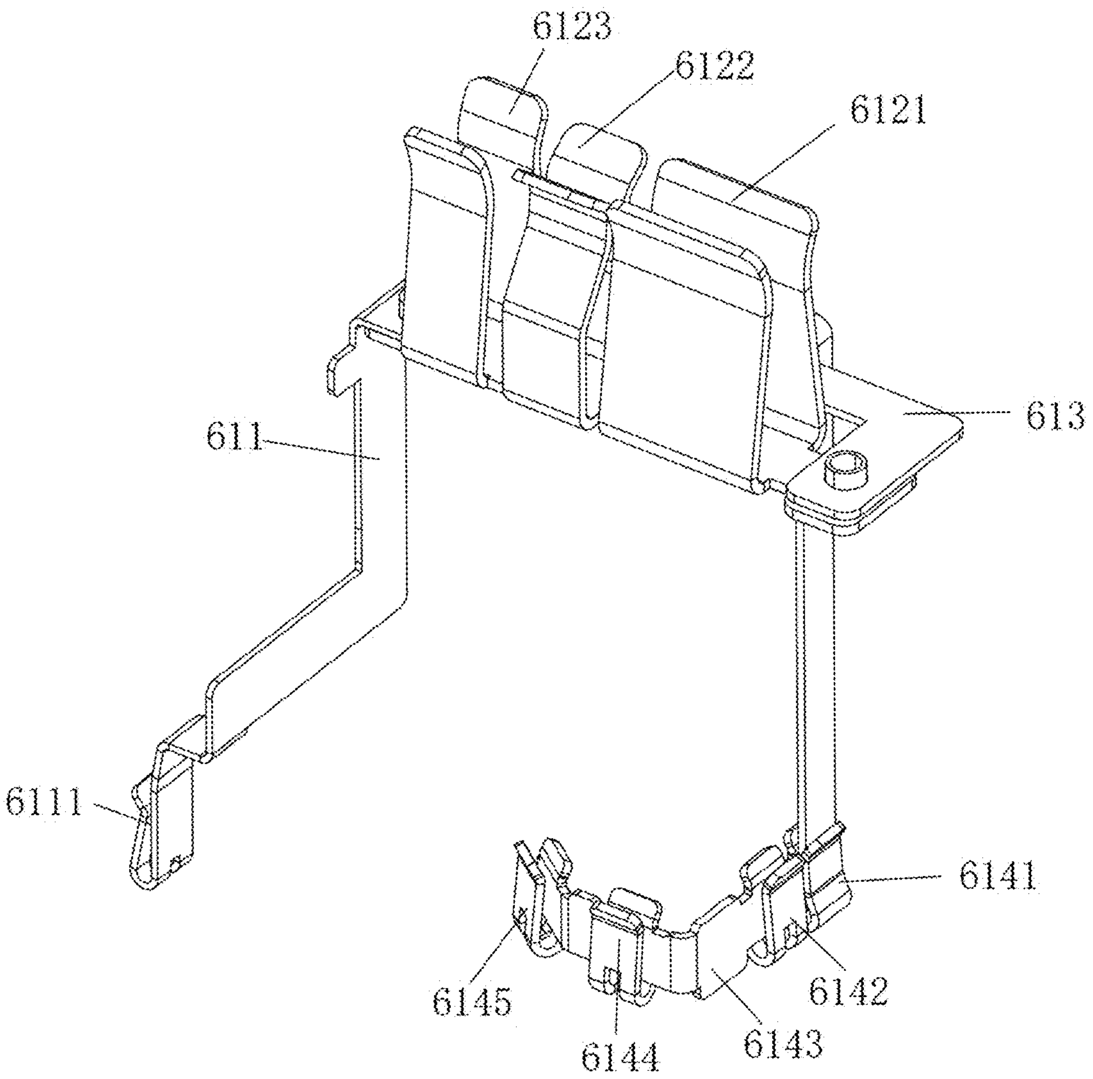
FIG. 11 is a structurally schematic view of a ground wire (PE) conduction assembly.
Figure 12:
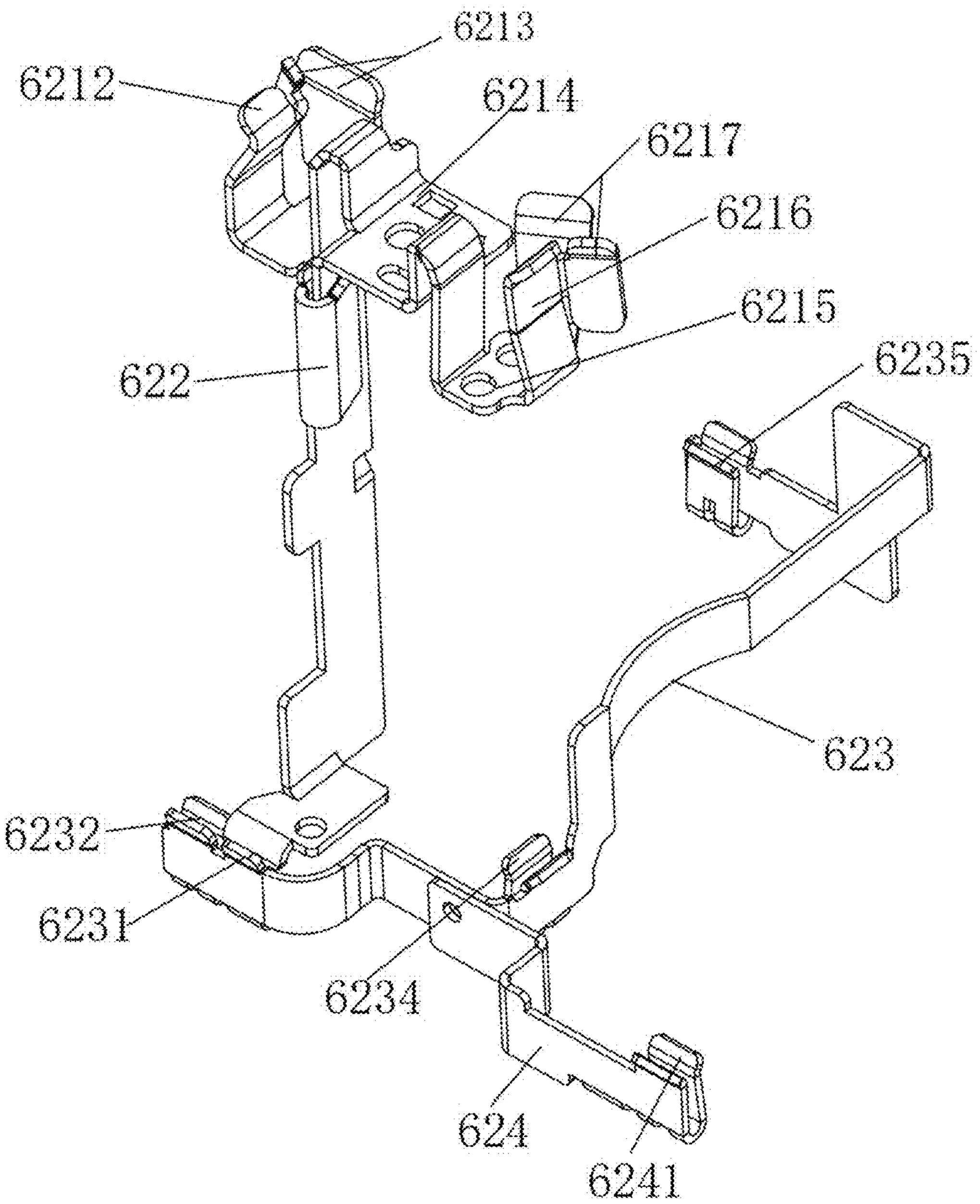
FIG. 12 is a structurally schematic view of a neutral wire (N) conduction assembly.
Figure 13:
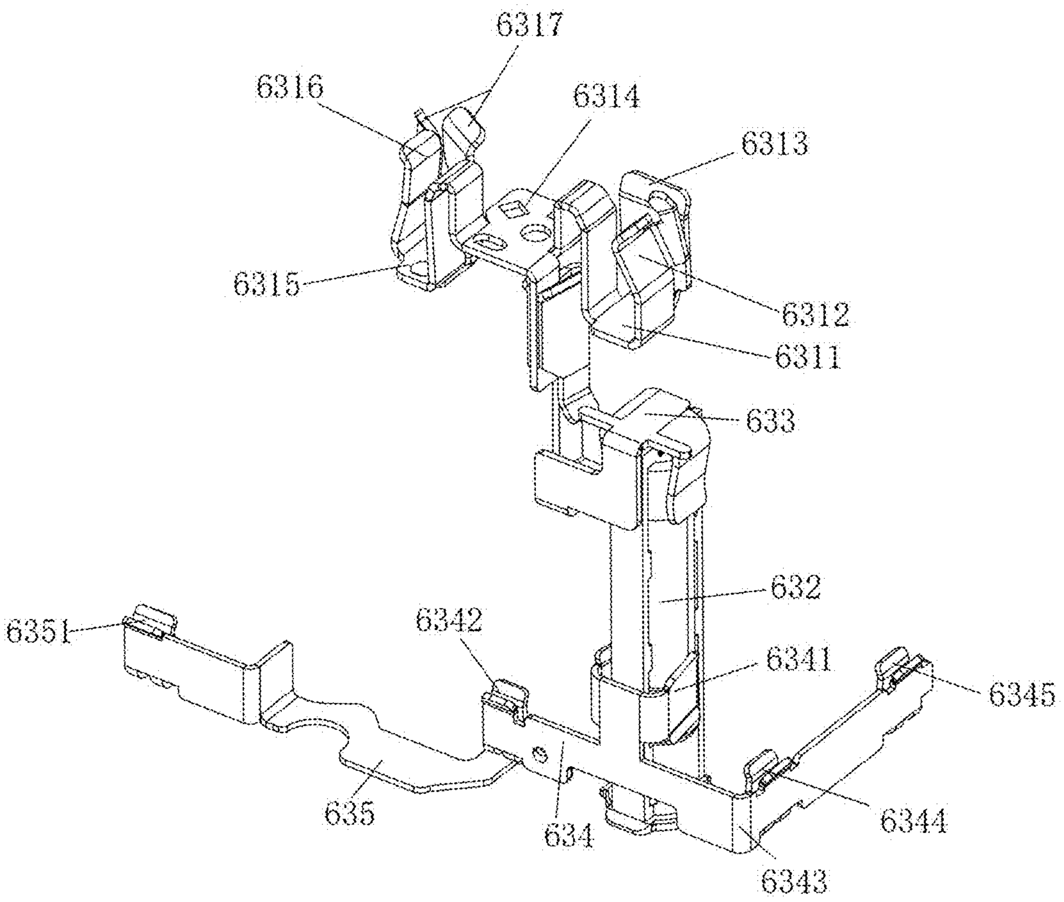
FIG. 13 is a structurally schematic view of a live wire (L) conduction assembly.

In the drawings, 10, power converter; 11, upper cover of main body; 111, socket hole; 11101, first insertion-hole; 11102, second insertion-hole; 11103, third insertion-hole; 11104, fourth insertion-hole; 11105, fifth insertion-hole; 11106, sixth insertion-hole; 11107, seventh insertion-hole; 11108, eighth insertion-hole; 11109, ninth insertion-hole; 11110, tenth insertion-hole; 11111, eleventh insertion-hole; 11112, twelfth insertion-hole; 12, lower cover of main body; 13, bracket;

20, UK-standard pin assembly; 21, UK-standard connector; 22, UK-standard key piece; 23, UK-standard ground wire pin; 24, UK-standard ground wire guide; 25, UK-standard neutral wire pin; 26, UK-standard neutral wire guide; 27, UK-standard live wire pins; 28, UK-standard live wire guide;

30, US-standard pin assembly; 31, US-standard connector; 32, US-standard key piece; 33, US-standard ground wire pin; 34, US-standard ground wire guide; 35, US-standard neutral wire pin; 36, US-standard neutral wire guide; 37, US-standard live wire pin; 38, US-standard live wire guide;

40, hybrid plug assembly of type CEE7/7; 401, hybrid plug ground wire guide; 402, hybrid plug connector; 403, hybrid plug key piece; 404, hybrid plug sleeve; 405, hybrid plug fixing rack; 406, hybrid plug gear; 407, hybrid plug bracket; 408, hybrid plug live wire pin; 409, hybrid plug live wire guide; 410, hybrid plug neutral wire pin; 411, hybrid plug neutral wire guide;

50, CN-standard or AU-standard pin assembly; 51, CN-standard or AU-standard connector; 52, CN-standard or AU-standard key piece; 53, CN-standard or AU-standard ground wire pin; 54, CN-standard or AU-standard ground wire guide; 55, CN-standard or AU-standard neutral wire pin; 56, CN-standard or AU-standard neutral wire guide; 57, CN-standard or AU-standard live wire pin; 58, CN-standard or AU-standard live wire guide;

60, conduction mechanism;

61, ground wire (PE) conduction assembly; 611, hybrid plug ground wire fixing guide; 6111, A hybrid plug ground wire clamping portion; 612, socket ground wire guide; 613, ground wire lower connecting guide; 6121, UK-standard insertion-hole ground wire clamping portion; 6122, CN-standard or AU-standard insertion-hole ground wire clamping portion; 6123, US-standard insertion-hole ground wire clamping portion; 614, pin ground wire fixing guide; 6141, ground wire connecting and clamping portion; 6142, US-standard ground wire clamping portion; 6143, pin ground wire connecting piece; 6144, UK-standard ground wire clamping portion; 6145, CN-standard or AU-standard ground wire clamping portion;

62, neutral wire (N) conduction assembly; 621, socket neutral wire guide; 6211, first neutral substrate; 6212, European insertion-hole neutral wire conduction piece; 6213, US-standard insertion-hole neutral wire conduction piece; 6214, second neutral wire substrate; 6215, third neutral wire substrate; 6216, UK-standard insertion-hole neutral wire conduction piece; 6217, CN-standard or AU-standard insertion-hole neutral wire conduction piece; 622, neutral wire lower connecting piece; 623, pin neutral wire fixing guide; 6231, neutral wire connecting and clamping portion; 6232, US-standard neutral wire clamping portion; 6233, neutral wire fixing connecting piece; 6234, UK-standard neutral wire clamping portion; 6235, CN-standard or AU-standard neutral wire clamping portion; 624, hybrid plug neutral wire fixing guide; 6241, hybrid plug neutral wire clamping portion;

63, live wire (L) conduction assembly; 631, socket live wire guide; 6311, first live wire substrate; 6312, European insertion-hole live wire conduction piece; 6313, US-standard insertion-hole live wire conduction piece; 6314, second live wire substrate; 6315, third live wire substrate; 6316, UK-standard insertion-hole live wire conduction piece; 6317, CN-standard or AU-standard insertion-hole live wire conduction piece; 632, fuse tube; 633, live wire lower connecting piece; 634, pin live wire fixing guide; 6341, fuse tube clamping portion; 6342, UK-standard live wire clamping portion; 6343, live wire extension piece; 6344, CN-standard or AU-standard live wire clamping portion; 6345, US-standard live wire clamping portion; 635, hybrid plug live wire fixing guide; 6351, hybrid plug live wire clamping portion.

DETAILED DESCRIPTION

In order to further explain the technical means and effects of the present utility model for achieving the intended purpose, the following detailed description of the embodiments of the present utility model will be made with reference to the accompanying drawings and preferred embodiments.

In the description of the present utility model, it should be understood that the directional or positional relationships indicated by the terms “length”, “width”, “height”, “up”, “down”, “before”, “after”, “left”, “right” and “vertical”, “level”, “top”, “bottom”, “inside”, “outside” and the like are based on the directional or positional relationships shown in the drawings. It is merely for the purpose of describing the present utility model and simplifying the description, and is not intended to indicate or imply that a particular orientation, configuration and operation of the referenced device or element is required and should not be construed as limiting the scope of the present utility model.

Furthermore, the terms "first" and "second" are used for descriptive purposes only and are not to be construed as indicating or implying relative importance or implicitly indicating the number of technical features indicated. Thus, a feature defined by "first" or "second" may explicitly or implicitly include one or more such features. In the description of the present utility model, the meaning of "a plurality" is two or more, unless specifically and specifically limited otherwise.

In the utility model, unless expressly stated or limited otherwise, the terms "mounted", "connected", "connecting", "fixed", and the like are to be interpreted broadly, e.g., either fixedly or detachably, or integrally connected. It may be a mechanical connection or an electrical connection. It may be a direct connection or indirect connection by an intermediary. It may be a communication between two elements, or may be in an interactive relationship between two elements, unless explicitly defined otherwise. The specific meaning of the above terms in the present utility model will be understood in specific circumstances by those of ordinary skill in the art.

With reference to FIGS. 1 to 19, an embodiment of the present utility model provides a conversion and conduction structure for a power converter, comprising:

a power converter 10 including an upper cover 11 of a main body, a lower cover 12 of the main body covered with the upper cover 11 of the main body, a bracket 13 disposed inside the upper cover 11 of the main body, a UK-standard pin assembly 20 arranged between the lower cover of the main body 12 and the upper cover 11 of the main body, a US-standard pin assembly 30, a hybrid plug assembly 40 of a type CEE7/7 type, and a CN-standard or an AU-standard pin assembly 50; a socket hole 111 is disposed on the upper cover 11 of the main body; wherein the power converter further comprises a conduction mechanism 60 disposed on the bracket 13 and extending downwards to respectively match the UK-standard pin assembly 20, the US-standard pin assembly 30, a hybrid plug assembly 40 of a type CEE7/7, and a CN-standard or an AU-standard pin assembly 50, wherein the conduction mechanism 60 comprises a ground wire (PE) conduction assembly 61 disposed in the middle of the bracket 13 and matching the socket hole 111, a neutral wire (N) conduction assembly 62 disposed on one side of the bracket 13 and matching the socket hole 111, and a live wire (L) conduction assembly 63 disposed on the other side of the bracket 13 and matching the socket hole 111. People can insert a socket on the hand into the socket hole 111 and push out any one of the UK-standard pin assembly 20, the US-standard pin assembly 30, the hybrid plug assembly 40 of the type CEE7/7, and the CN-standard or AU-standard pin assembly 50, thereby achieving pin conversion to meet one's needs for different socket plugs.

With regard to the specific structural arrangement of the socket hole 111, as shown in FIG. 1, the socket hole 111 comprises a first insertion-hole 11101, a second insertion-hole 11102, a third insertion-hole 11103, a fourth insertion-hole 11104, a fifth insertion-hole 11105, a sixth insertion-hole 11106, a seventh insertion-hole 11107, an eighth insertion-hole 11108, a ninth insertion-hole 11109, a tenth insertion-hole 11110, an eleventh insertion-hole 11111 and a twelfth insertion-hole 11112. The third insertion-hole 11103, the fourth insertion-hole 11104 and the seventh insertion-hole 11107 are linearly arranged from front to rear. The first insertion-hole 11101 and the second insertion-hole 11102 are both located at the left side of the third insertion-hole 11103, the fifth insertion-hole 11105 and the sixth insertion-hole 11106 are both located at the right side of the third insertion-hole 11103. The eighth insertion-hole 11108 and the ninth insertion-hole 11109 are both located at the left side and rear of the seventh insertion-hole 11107. The tenth insertion-hole 11110 and the eleventh insertion-hole 11111 are both located at the right side and rear of the seventh insertion-hole 11107. The second insertion-hole 11102, the fifth insertion-hole 11105 and the seventh insertion-hole 11107 are combined to form a US-standard insertion-hole. The first insertion-hole 11101, the third insertion-hole 11103 and the sixth insertion-hole 11106 are combined to form a European insertion-hole. The third insertion-hole 11103, the eighth insertion-hole 11108 and the eleventh insertion-hole 11111 are combined to form an UK-standard insertion-hole. The fourth insertion-hole 11104, the ninth insertion-hole 11109 and the tenth insertion-hole 11110 are combined to form a CN-standard or an AU-standard insertion-hole. The special modular insertion-hole group structure design on the socket hole 111, in combination with the UK-standard pin assembly 20, the US-standard pin assembly 30, the hybrid plug assembly 40 of the type CEE7/7, and the CN-standard or AU-standard pin assembly 50, may be applied to the conversion between multi-country plugs and insertion-holes, greatly improving the scope of use thereof.

With regard to the conductive connection mode between the ground wire (PE) conduction assembly 61 and the multi-country plug, as shown in FIGS. 3 and 8-11, the ground wire (PE) conduction assembly 61 comprises a socket ground wire guide 612 on the middle of the bracket 13. The socket ground wire guide 612 comprises an UK-standard insertion-hole ground wire clamping portion 6121 directly facing the third insertion-hole 11103, a CN-standard or an AU-standard insertion-hole ground wire clamping portion 6122 directly facing the fourth insertion-hole 11104, and a UK-standard insertion-hole ground wire clamping portion 6123 directly facing the seventh insertion-hole 11107. Through the one-to-one corresponding structural arrangement, the European socket, the Australian socket and the US-standard socket may be inserted into the socket hole 111. The pins of the socket may be correspondingly clamped by each clamping portion, so as to cooperate with the protruding and using of the UK-standard pin assembly 20, the US-standard pin assembly 30, the hybrid plug assembly 40 of the type CEE7/7, and the CN-standard or AU-standard pin assembly 50, so as to complete the conversion between the multi-country plug and socket, and greatly improve the scope of use thereof.

With regard to the conductive connection mode between the live wire (L) conduction assembly 63 and the multi-country plug, as shown in FIGS. 3, 8-10 and 12, the live wire (L) conduction assembly 63 comprises a socket live wire guide 631 at one side of the bracket 13. The socket live wire guide 631 comprises a first live wire substrate 6311 disposed on the bracket 13, a European insertion-hole live wire guide 6312 disposed on the first live wire substrate 6311, extending upwards and directly facing the sixth insertion-hole 11106, a US-standard insertion-hole live wire conduction piece 6313 disposed on the first live wire substrate 6311, extending upwards and facing the fifth insertion-hole 11105, a second live wire substrate 6314 connected to a lower side of the first live wire substrate 6311, a third live wire substrate 6315 connected to the second live wire substrate 6314, and a UK-standard insertion-hole live wire conduction piece 6316 disposed on the third live wire substrate 6315, extending upwards and facing the eleventh insertion-hole 11111, and a CN-standard or an AU-standard insertion-hole live wire conduction piece 6317 symmetrically disposed on the third live wire substrate 6315 respectively and extending upwards and directly facing the two sides of the tenth insertion-hole 11110. After the European socket is correspondingly inserted into the socket hole 111, the live wire pin thereof is inserted into the sixth insertion-hole 11106 to contact and conduct with the European insertion-hole live wire conduction piece 6312. After the US-standard socket is correspondingly inserted into the socket hole 111, the live wire pin thereof is inserted into the fifth insertion-hole 11105 to contact and conduct with the US-standard insertion-hole live wire conduction piece 6313. After the UK-standard socket is correspondingly inserted into the socket hole 111, the live wire pin thereof is inserted into the eleventh insertion-hole 11111 to contact and conduct with the UK-standard insertion-hole live wire conduction piece 6316. After the CN-standard or AU-standard socket is correspondingly inserted into the socket hole 111, the live wire pin thereof is inserted into the tenth insertion-hole 11110 to contact and conduct with the CN-standard or AU-standard insertion-hole live wire conduction piece 6317.

With regard to the conductive connection mode between the neutral wire (N) conduction assembly 62 and a multi-country plug, as shown in FIGS. 3, 8-10 and 13, the neutral wire (N) conduction assembly 62 comprises a socket neutral wire guide 621 disposed on the other side of the bracket 13. The socket neutral wire guide 621 comprises a first neutral wire substrate 6211 disposed on the bracket 13, a European insertion-hole neutral wire guide 6212 disposed on the first neutral wire substrate 6211, extending upwards and facing the first insertion-hole 11101, a US-standard insertion-hole neutral wire conduction piece 6213 disposed on the first neutral wire substrate 6211, extending upwards and facing the second insertion-hole 11102, a second neutral wire substrate 6214 connected to a lower side of the first neutral wire substrate 6211, a third neutral wire substrate 6215 connected to the second neutral wire substrate 6214, a UK-standard insertion-hole neutral wire conduction piece 6216 disposed on the third neutral wire substrate 6215, extending upwards and facing the eighth insertion-hole 11108, and a CN-standard or an AU-standard insertion-hole neutral wire conduction piece 6217 symmetrically disposed on the third neutral wire substrate 6215 respectively, extending upwards and facing the two sides of the ninth insertion-hole 11109. After the European socket is correspondingly inserted into the socket hole 111, the neutral wire pin thereof is inserted into the first insertion-hole 11101 to contact and conduct with the European insertion-hole neutral wire conduction piece 6212. After the US-standard socket is correspondingly inserted into the socket hole 111, the neutral wire pin thereof is inserted into the second insertion-hole 11102 to contact and conduct with the US-standard insertion-hole neutral wire conduction piece 6213. After the UK-standard socket is correspondingly inserted into the socket hole 111, the neutral wire pin thereof is inserted into the eighth insertion-hole 11108 to contact and conduct with the UK-standard insertion-hole neutral wire conduction piece 6216.

With regard to the specific structural arrangement of the US-standard pin assembly 30, as shown in FIGS. 2 to 4 and 16, the US-standard pin assembly 30 comprises a US-standard connector 31, a US-standard key piece 32 slidingly connected to the US-standard connector 31, a US-standard ground wire pin 33 installed in the US-standard connector 31 and extending downwards, a US-standard ground wire guide 34 disposed at the top of the US-standard ground wire pin 33 and extending downwards, and a US-standard neutral wire pin 35 disposed in the US-standard connector 31 and extending downwards, a US-standard neutral wire guide 36 disposed at the top of the US-standard neutral wire pin 35 and extending downwards, a US-standard live wire pin 37 disposed in the US-standard connector 31 and extending downwards, and a US-standard live wire guide 38 disposed at the top of the US-standard live wire pin 37 and extending downwards. When an external force is applied to the US-standard key piece 32, the US-standard key piece 32 drives the US-standard connector 31 disposed thereon and the US-standard ground wire pin 33, the US-standard ground guide 34, the US-standard neutral wire pin 35, the US-standard neutral wire guide 36, the US-standard live wire pin 37 and the US-standard live guide 38 disposed on the US-standard connector 31 to move up and down synchronously. For the other structure and use mode (control mode) of the US-standard pin assembly 30, reference can be made to utility model patent No. 201920478501.9. Thus, the description thereof will not be repeated in this embodiment.

With regard to the specific structural arrangement of the UK-standard pin assembly 20, as shown in FIGS. 2-3, 5 and 17, the UK-standard pin assembly 20 comprises a UK-standard connector 21, a UK-standard key piece 22 slidingly connected to the UK-standard connector 21, a UK-standard ground wire pin 23 installed in the UK-standard connector 21 and extending downwards, a UK-standard ground wire guide 24 disposed at the top of the UK-standard ground wire pin 23 and extending downwards, and a UK-standard neutral wire pin 25 disposed in the UK-standard connector 21 and extending downwards, a UK-standard neutral wire guide 26 disposed at the top of the UK-standard neutral wire pin 25 and extending downwards, a UK-standard live wire pin 27 disposed in the UK-standard connector 21 and extending downwards, and a UK-standard live wire guide 28 disposed at the top of the UK-standard live wire pin 27 and extending downwards in a bending manner. When an external force is applied to the UK-standard key 22, the UK-standard key 22 drives the UK-standard connector 21 disposed thereon and the UK-standard ground wire pin 23, the UK-standard ground wire guide 24, the UK-standard neutral wire pin 25, the UK-standard neutral wire guide 26, the UK-standard live wire pin 27 and the UK-standard live guide 28 disposed on the UK-standard connector 21 to move up and down synchronously. For the other structure and use mode (control mode) of the UK-standard pin assembly 20, reference can be made to utility model patent No. 201920478501.9. Thus, the description thereof will not be repeated in this embodiment.

With regard to the specific structural arrangement of the hybrid plug assembly 40 of the type CEE7/7, as shown in FIGS. 2-3 and 7, and FIGS. 14 and 15, the hybrid plug assembly 40 of the type CEE7/7 comprises a hybrid plug connector 402, a hybrid plug key piece 403 slidingly connected to the hybrid plug connector 402, a hybrid plug sleeve 404 linked with the hybrid plug key piece 403, a hybrid plug fixing rack 405 disposed on the power converter 10, a hybrid plug gear 406 engaged with one end of the hybrid plug fixing rack 405, a hybrid plug bracket 407 engaged with the other end of the hybrid plug gear 406, and a hybrid plug bracket 407 matched with the hybrid plug connector. The hybrid plug support 407 comprises a hybrid plug live wire pin 408 extending downwards at one side, a hybrid plug live wire guide 409 disposed at the top of the hybrid plug live wire pin 408 and extending downwards in a bending manner, a hybrid plug neutral wire pin 410 disposed at the other side of the hybrid plug bracket 407 and extending downwards in a bending manner, a hybrid plug neutral wire guide 411 disposed at the top of the hybrid plug neutral wire pin 410 and extending downwards in a bending manner, and a hybrid plug ground guide 401 with one end sleeved in the hybrid plug sleeve 404 and the other end protruding out of the hybrid plug connector 402. When an external force is applied to the hybrid plug key piece 403, the hybrid plug key piece 403 drives the hybrid plug connector 402 and the hybrid plug sleeve 404 to protrude outwards from the power converter 10. However, since the hybrid plug fixing rack 405 is a hybrid plug gear 406 which is fixed on the power converter 10 and moves downwards continuously, a rolling action will occur along the hybrid plug fixing rack 405. In this process, since the hybrid plug gear 406 moves downwards synchronously with the hybrid plug bracket 407, the hybrid plug bracket 407 drives the hybrid plug live wire pin 408, the hybrid plug live wire guide 409, the hybrid plug neutral wire pin 410 and the hybrid plug neutral wire guide 411 to continuously move down and make the hybrid plug neutral wire pin 410 and the hybrid plug live wire pin 408 to protrude outwards from the power converter 10. For the other structure and use mode (control mode) of the hybrid plug assembly 40 of the type CEE7/7, reference can be made to the utility model patent No. 202010285974.4. Thus, the description thereof will not be repeated in this embodiment. The hybrid plug of the type CEE7/7 is a plug standard in Europe, including 16 A/250 V, type E/F plugs in France and Germany.

With regard to the specific structural arrangement of the CN-standard or AU-standard pin assembly 50, as shown in FIGS. 2-3, 6 and 18 and 19, the CN-standard or AU-standard pin assembly 50 comprises a CN-standard or an AU-standard connector 51, a CN-standard or an AU-standard key piece 52 slidingly connected to the CN-standard or AU-standard connector 51, a CN-standard or an AU-standard ground wire pin 53 installed in the CN-standard or AU-standard connector 51 and extending downwards, and a CN-standard or an AU-standard ground guide 54 disposed at the top of the CN-standard or AU-standard ground wire pin 53 and extending downwards in a bending manner, a CN-standard or an AU-standard neutral wire pin 55 provided in the CN-standard or AU-standard connector 51 and extending downwards, a CN-standard or an AU-standard neutral wire guide 56 disposed at the top of the CN-standard or AU-standard neutral wire pin 55 and extending downwards, a CN-standard or an AU-standard live wire pin 57 disposed in the CN-standard or AU-standard connector 51 and extending downwards, and a CN-standard or an AU-standard live wire guide 58 disposed at the top of the CN-standard or AU-standard live wire pin 57 and extending downwards in a bending manner. When an external force is applied to the CN-standard or AU-standard key piece 52, the CN-standard or AU-standard key piece 52 drives the CN-standard or AU-standard connector 51 disposed thereon and the CN-standard or AU-standard ground wire pin 53, the CN-standard or AU-standard ground guide 54, the CN-standard or AU-standard neutral wire pin 55, the CN-standard or AU-standard neutral wire guide 56, the CN-standard or AU-standard live wire pin 57, and the CN-standard or AU-standard live wire guide 58 disposed on the CN-standard or AU-standard connector 51 to move up and down synchronously. For the other structure and use mode (control mode) of the CN-standard or AU-standard pin assembly 50, reference can be made to utility model patent No. 201920478501.9. Thus, the description thereof will not be repeated in this embodiment.

With regard to the specific structural arrangement of the ground wire (PE) conduction assembly 61, as shown in FIGS. 3 and 8-11, the ground wire (PE) conduction assembly 61 further comprises a ground wire lower connecting guide 613 connected to one end of the socket ground wire guide 612, a pin ground wire fixing guide 614 with one end connected and clamped to the tail end of the ground wire lower connecting guide 613 and having an overall "]" shape extending vertically and bent in a horizontal direction, and a hybrid plug ground wire fixing guide 611 disposed on the bracket 13 and having one end extending and bent in the direction of the lower cover of the main body 12. One end of the hybrid plug ground wire fixing guide 611 close to the lower cover of the main body 12 is formed with a hybrid plug ground wire clamping portion 6111. The hybrid plug ground wire guide 401 is correspondingly inserted into the hybrid plug ground wire clamping portion 6111.

With regard to the specific structural arrangement of the pin ground wire fixing guide 614, as shown in FIGS. 3 and 8-11, the pin ground wire fixing guide 614 comprises a ground wire connecting and clamping portion 6141 for clamping the tail end of the ground wire lower connection guide 613, a US-standard ground wire clamping portion 6142 disposed at one side of the ground wire connecting and clamping portion 6141 and clamping the US-standard ground wire guide 34, a pin ground wire connecting piece 6143 disposed on the other side of the US-standard ground wire clamping portion 6142, a UK-standard ground wire clamping portion 6144 disposed on one side of the pin ground wire connecting piece 6143 and clamping the UK-standard ground wire guide 24, and a CN-standard or an AU-standard ground wire clamping portion 6145 disposed on one side of the UK-standard ground wire clamping portion 6144 and clamping the CN-standard or AU-standard ground wire guide 54. The ground wire connecting and clamping portion 6141 clamps the tail end of the ground wire lower connection guide 613 so as to realize the ground wire connection of the multi-country standard socket installed on the socket hole 111. When the US-standard ground wire clamping portion 30 is pushed out of the power converter 10, the US-standard ground wire guide 34 is inserted to the US-standard ground wire clamping portion 6142, so that the ground wire of the US-standard ground wire clamping portion 30 is connected to the ground wire of the installed multi-country standard socket. When the UK-standard pin assembly 20 is pushed out of the power converter 10, the UK-standard ground wire guide 24 is inserted into the UK-standard ground wire clamping portion 6144, so that the ground wire of the UK-standard pin assembly 20 is connected to the ground wire of the installed multi-country standard socket. When the UK-standard pin assembly 20 is pushed out of the power converter 10, the CN-standard or AU-standard ground wire guide 54 is inserted into the CN-standard or AU-standard ground wire clamping portion 6145, so that the ground wire of the CN-standard or AU-standard pin assembly 50 is connected to the ground wire of the installed multi-country standard socket.

With regard to the specific structural arrangement of the neutral wire (N) conduction assembly 62, as shown in FIGS. 3, 8-10 and 12, the neutral wire (N) conduction assembly 62 further comprises a socket neutral wire guide 621 disposed at one side of the bracket 13, a neutral wire lower connecting piece 622 which is integrally perpendicular to the lower cover 12 of the main body and is clamped at the top of and connected to the socket neutral wire guide 621, and a pin neutral wire fixing guide 623 for clamping the tail end of the neutral wire lower connecting piece 622, and a hybrid plug neutral wire fixing guide 624 connected to one side of the pin neutral conductor 623 and extending to a side edge of the hybrid plug sleeve 404 facing the hybrid plug neutral conductor 411.

With regard to the specific structural arrangement of the pin neutral wire fixing guide 623, as shown in FIGS. 3, 8-10 and 12, the pin neutral wire fixing guide 623 comprises a neutral wire connecting and clamping portion 6231 for clamping the tail end of the neutral wire lower connecting piece 622, a US-standard neutral wire clamping portion 6232 disposed at one side of the neutral wire connecting and clamping portion 6231 and capable of clamping the US-standard neutral wire guide 36, a neutral wire fixing connecting piece 6233 disposed at the other side of the neutral wire connecting and clamping portion and having a "⨆" shape as a whole, a UK-standard neutral wire clamping portion 6234 which is disposed at one end of the neutral wire fixing connecting piece 6233 and capable of clamping the UK-standard neutral wire guide 26, a CN-standard or an AU-standard neutral wire clamping portion 6235 which is disposed at the other end of the neutral wire fixing connecting piece 6233 and capable of clamping the CN-standard or AU-standard neutral wire guide 56. The hybrid plug neutral wire fixing guide 624 is connected to the neutral wire fixing connecting piece 6233, and one end of the hybrid plug neutral wire fixing guide 624 away from the neutral wire fixing connecting piece 6233 is formed with a hybrid plug neutral wire clamping portion 6241 capable of clamping the hybrid plug neutral wire guide 411. The connection of the neutral wire of the multi-country standard socket mounted on the socket hole 111 is achieved by clamping the neutral wire lower connecting piece 622 by providing the neutral wire connecting and clamping portion 6231. When the US-standard ground wire clamping portion **3*o* is pushed out of the power converter 10, the US-standard neutral wire guide 36 is inserted to US-standard ground neutral wire clamping portion 6232, so as to realize the connection of the neutral wire of the US-standard ground neutral wire assembly 30 with the neutral wire of the installed multi-country standard socket. The neutral wire fixed connecting piece 6233 has a "⨆" shape as a whole, so as to effectively avoid the hybrid plug assembly 40 of the type CEE7/7 and prevent the hybrid plug assembly 40 of the type CEE7/7 from being used in a protruding manner. When the UK-standard pin assembly 20 is pushed out of the power converter 10, the pin guide 26 is inserted into the UK-standard neutral wire clamping portion 6234, so that the pin of the UK-standard pin assembly 20 is connected with the pin of the installed multi-standard socket. When the CN-standard or AU-standard pin assembly 50 is pushed out of the power converter 10, the CN-standard or AU-standard neutral wire guide 56 is inserted to the CN-standard or AU-standard neutral wire clamping portion 6235, so that the neutral wire of the CN-standard or AU-standard pin assembly 50 is connected with the neutral wire of the installed multi-country standard socket. When the hybrid plug assembly 40 of the type CEE7/7 is pushed out of the power converter 10, the hybrid plug neutral wire guide 411 is inserted to the hybrid plug neutral wire clamping portion 6241, so as to realize the connection of the neutral wire of the hybrid plug assembly 40** of the type CEE7/7 and the neutral wire of the installed multi-country standard socket.

With regard to the specific structural arrangement of the live wire (L) conduction assembly 63, as shown in FIGS. 3, 8-10 and 13, the live wire (L) conduction assembly 63 comprises a fuse tube 632 disposed on the lower cover 12 of the main body, a live wire lower connecting piece 633 with the top end connected to the socket live wire guide 631 and the tail end in communication with the fuse tube 632, a pin live wire fixing guide 634 conducting with the lower end of the fuse tube 632 and in the form of a "⅃" as a whole, and one side of the hybrid plug live wire fixing guide 635 connected to the pin live wire fixing guide 634, extending to a side edge of the hybrid plug ferrule 404 and facing the hybrid plug live wire guide 409.

With regard to the specific structural arrangement of the pin live wire fixing guide 634, as shown in FIGS. 3, 8-10 and 13, the pin live wire fixing guide 634 comprises a clamping portion of a fuse tube 632 for clamping the tail end of the fuse tube 632, a UK-standard live wire clamping portion 6342 extending in the direction of the hybrid plug assembly 40 of the type CEE7/7 and capable of clamping the UK-standard live wire guide 28, a live wire extension piece 6343 connected to the clamping portion of the fuse tube 632 and having a "⅃" shape as a whole, a CN-standard or an AU-standard live wire clamping portion 6344 which is disposed on one end of the live wire extension piece 6343 after bending and capable of clamping the CN-standard or AU-standard live wire guide 58, and a US-standard live wire clamping portion 6345 which is disposed on one side of the CN-standard or AU-standard live wire clamping portion 6344 and capable of clamping the US-standard live wire guide 38. The hybrid plug live wire fixing guide 635 is disposed on the inner side of the end of the pin live wire fixing guide 634 close to the UK-standard live wire clamping portion 6342. The end of the hybrid plug live wire fixing guide 635 close to the hybrid plug assembly 40 of the type CEE7/7 is formed with a hybrid plug live wire clamping portion 6351 capable of clamping the hybrid plug live wire guide 409. The fuse tube clamping portion 6341 is effectively clamped on the fuse 632, thereby reducing the risk of electric leakage and contact during use. When the hybrid plug assembly 40 of the type CEE7/7 is pushed out of the power converter 10, the hybrid plug live wire guide 409 is inserted to the hybrid plug live wire clamping portion 6342, so as to realize the connection of the live wire of the hybrid plug assembly 40 of the type CEE7/7 and the live wire of the multi-country standard socket installed on the power converter 10. When the UK-standard pin assembly 20 is pushed out of the power converter 10, the pin guide 28 is inserted to the UK-standard live wire clamping portion 6342, so as to realize the connection of the live wire of the UK-standard pin assembly 20 and the live wire of the multi-standard socket installed on the power converter 10. The live wire extension piece 6343 is in the form of a "⅃" as a whole so as to be better fitted on the lower cover 12 of the main body, avoiding space for other components such as a baffle in the power converter 10. When the CN-standard or AU-standard pin assembly 50 is pushed out of the power converter 10, the CN-standard or AU-standard live wire guide 58 is inserted to the CN-standard or AU-standard live wire clamping portion 6344, so as to realize the connection of the live wire of the CN-standard or AU-standard pin assembly 50 and the live wire of the multi-country standard socket installed on the power converter 10. When the US-standard pin assembly 30 is pushed out of the power converter 10, the US-standard live wire guide 38 is inserted to the US-standard live wire clamping portion 6345, so as to realize the connection of the live wire of the US-standard pin assembly 30 and the live wire of the multi-country socket installed on the power converter 10.

The clamping portions mentioned in this embodiment can all be U-shaped clamps, which are simple in structure, convenient in use and easy to insert.

The operating principle is as follows.

As shown in FIGS. 1, 3 and 8-9, when it is necessary to convert a US-standard socket into another national standard pin, a neutral wire pin in the US-standard socket can be correspondingly inserted into the second insertion-hole 11102, a live wire pin thereof may be inserted into a fifth insertion-hole 11105, and a ground line pin thereof can be inserted into the seventh insertion-hole 11107, so as to realize the conduction between the US-standard socket and the power converter 10, facilitating the conversion of pins by a person. The conduction structure thereof is stable, improving the safety of the power converter 10.

As shown in FIGS. 1, 3 and 8-9, when it is necessary to convert an UK-standard socket into another national standard pin, the ground wire pin in the UK-standard socket can be correspondingly inserted into the third insertion-hole 11103, the neutral wire pin thereof can be inserted into the eighth insertion-hole 11108, and the live wire pin thereof can be inserted into the eleventh insertion-hole 11111, so as to realize the conduction between the UK-standard socket and the power converter 10, facilitating the conversion of pins by a person. The conduction structure thereof is stable, improving the safety of the power converter 10.

As shown in FIGS. 1, 3 and 8-9, when it is necessary to convert a CN-standard socket or an AU-standard socket into another national standard pin, a ground wire pin in the CN-standard socket or the AU-standard socket can be correspondingly inserted into the fourth insertion-hole 11104, a neutral wire pin thereof can be inserted into the ninth insertion-hole 11109, and a live wire pin thereof can be inserted into the tenth insertion-hole 11110, so as to realize the conduction between the CN-standard socket or the AU-standard socket and the power converter 10, which facilitates the conversion of pins. The conduction structure thereof is stable, improving the safety of the power converter 10.

Figure 16:
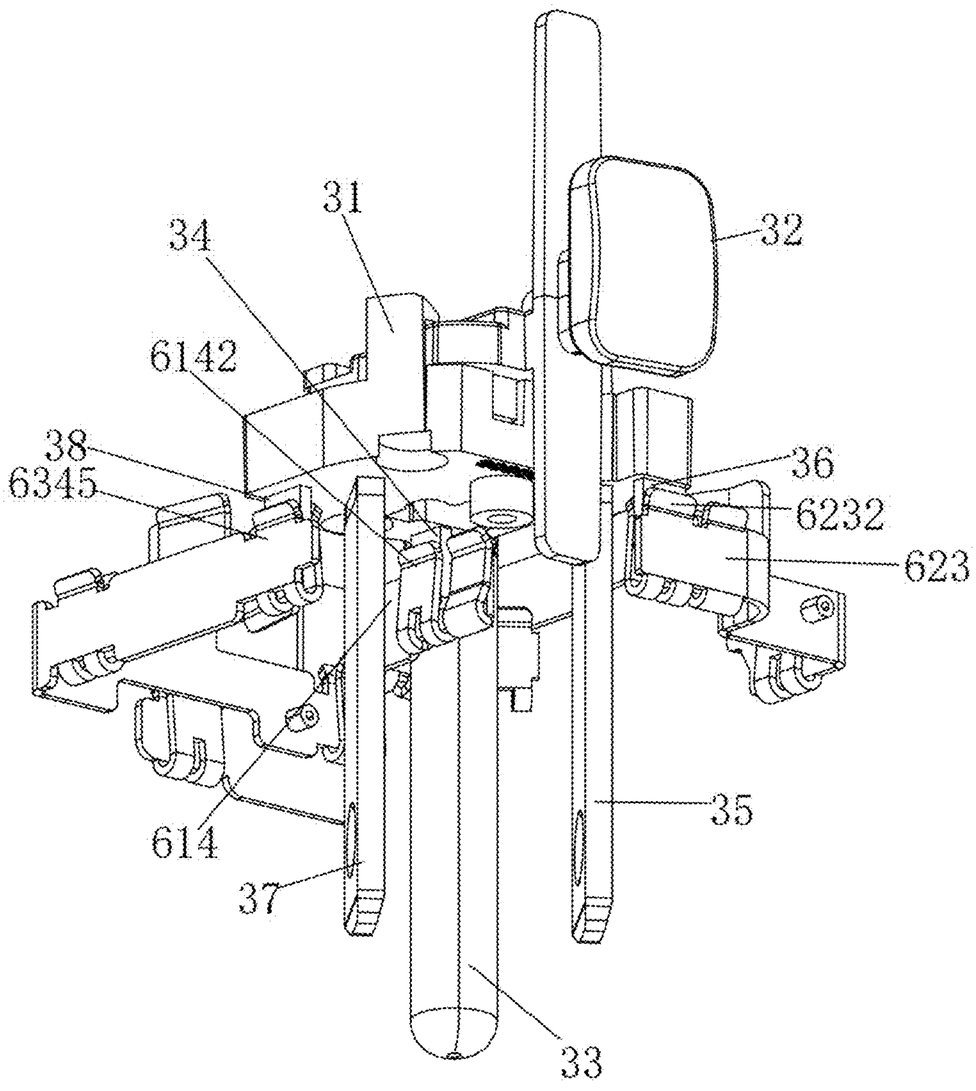
FIG. 16 is a use state view of a US-standard pin assembly.

When it is required to convert the inserted multi-country standard socket into a UK-standard pin, as shown in FIG. 16, an external force is applied to a key of the pin key piece 22, so that the UK-standard pin key piece 22 pushes the UK-standard pin connector 21, the UK-standard ground wire pin 23, the UK-standard ground wire guide 24, the UK-standard neutral wire pin 25, the UK-standard neutral wire guide 26, the UK-standard live wire pin 27, the UK-standard live guide 28 and other components thereon together to be pushed out. At this time, the UK-standard ground wire pin 23, the UK-standard neutral wire pin 25 and the UK-standard live wire pin 27 protrude out of the power converter 10. The UK-standard ground wire guide 24 is correspondingly inserted into the UK-standard ground wire clamping portion 6144, the UK-standard neutral wire guide 26 is correspondingly inserted into the UK-standard neutral wire clamping portion 6234, and the UK-standard live wire guide 28 is correspondingly inserted into the UK-standard live wire clamping portion 6342, so that the UK-standard pin assembly 20 is electrically connected with the plug-in and installed multi-country standard socket, and the pin conversion is completed, which is convenient for people to use.

Figure 17:
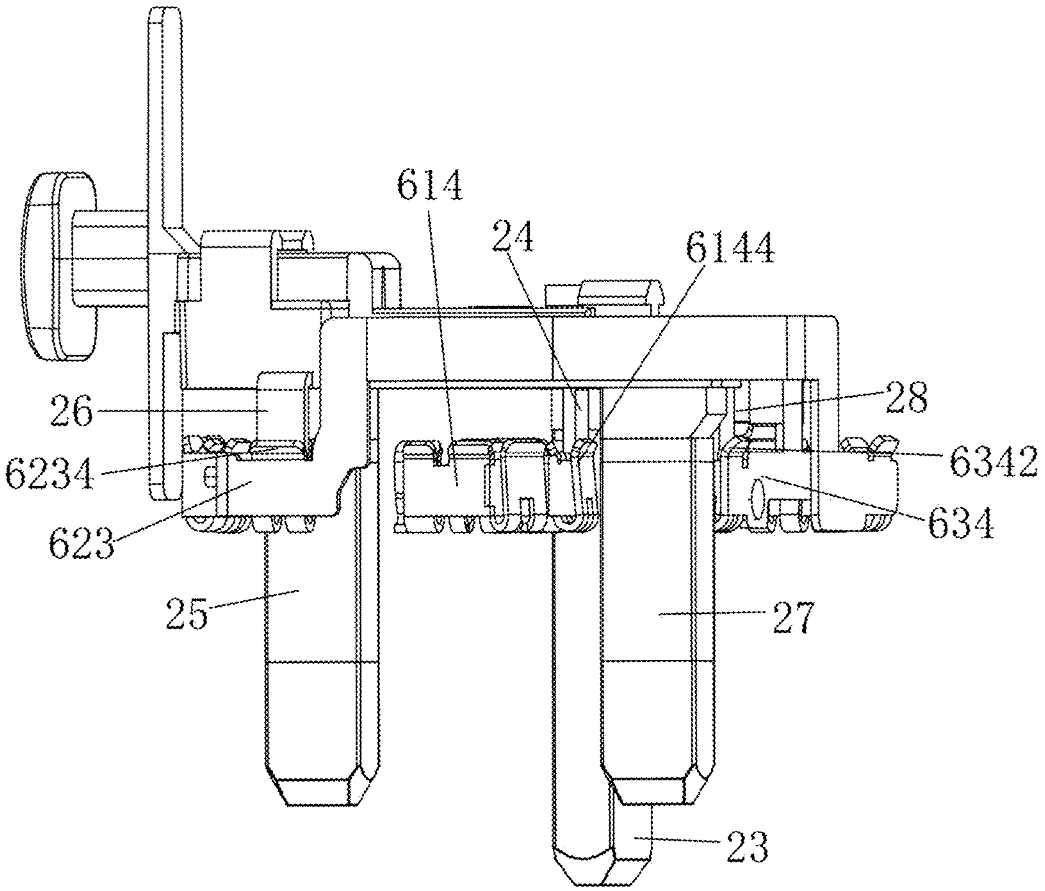
FIG. 17 is a use state view of a UK-standard pin assembly.
Figure 18:
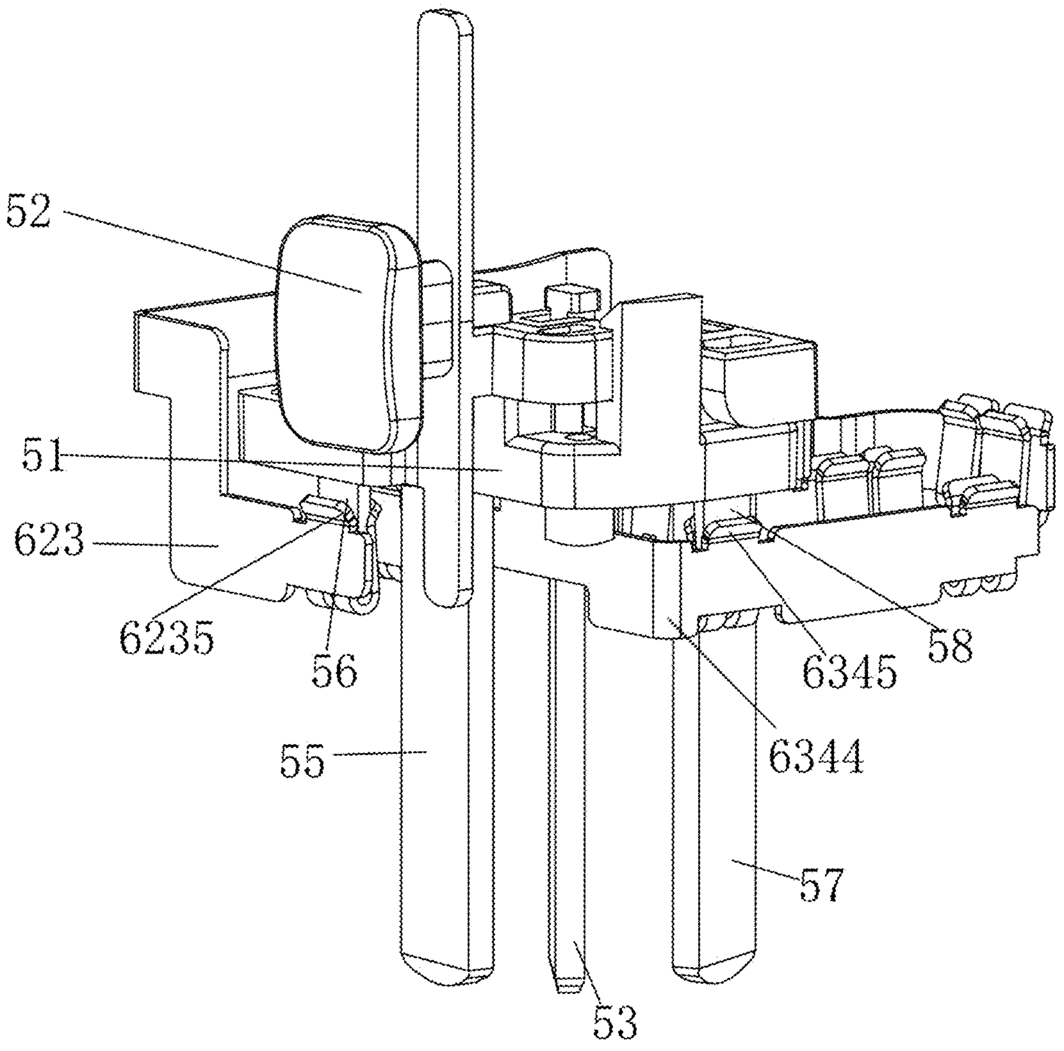
FIG. 18 is a use state view of a CN-standard or an AU-standard pin assembly.

When it is required to convert the inserted multi-country standard socket into a US-standard pin, as shown in FIG. 17, an external force is applied to a key of the pin key piece 32, so that the US-standard pin key piece 32 pushes the US-standard pin connector 31, the US-standard ground wire pin 33, the US-standard ground wire guide 34, the US-standard neutral wire pin 35, the US-standard neutral wire guide 36, the US-standard live wire pin 37, the US-standard live guide 38 and other components thereon together to be pushed out. At this time, the US-standard ground wire pin 33, the US-standard neutral wire pin 35 and the US-standard live wire pin 37 protrude out of the power converter 10. The US-standard ground wire guide 34 is correspondingly inserted into the US-standard ground wire clamping portion 6142, the US-standard neutral wire guide 36 is correspondingly inserted into the US-standard neutral wire clamping portion 6232, and the US-standard live wire guide 38 is correspondingly inserted into the US-standard live wire clamping portion 6345, so that the US-standard pin assembly 30 is electrically connected with the plug-in and installed multi-country standard socket, and the pin conversion is completed, which is convenient for people to use.

Figure 14:
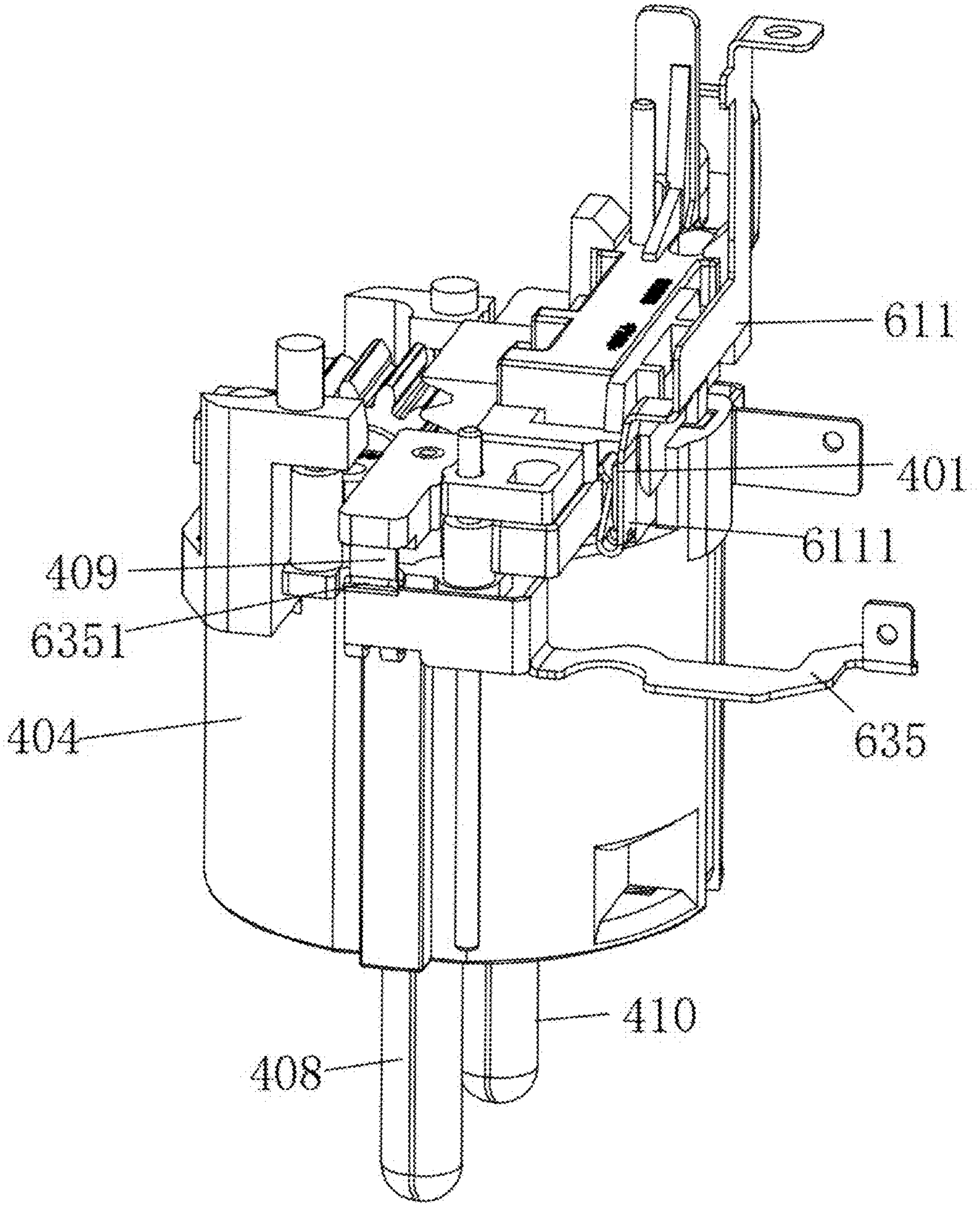
FIG. 14 is a use state view of the hybrid plug assembly of the type CEE7/7.
Figure 15:
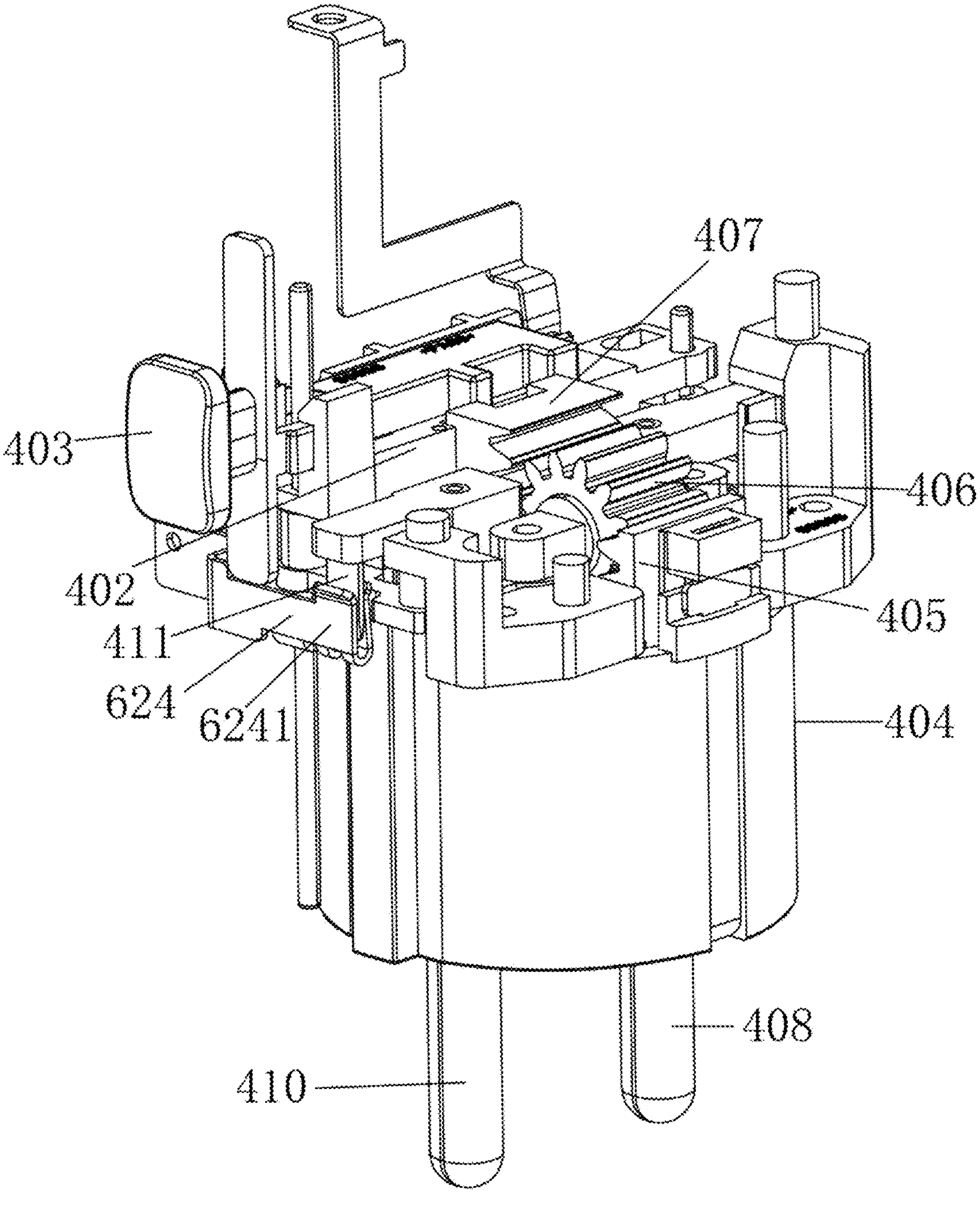
FIG. 15 is a further use state view of the hybrid plug assembly of the type CEE7/7.

When it is required to convert the multi-country standard socket of the illustration into a hybrid plug of the type CEE7/7, as shown in FIGS. 14 and 15, an external force is applied to the hybrid plug key piece 403, and the hybrid plug key piece 403 drives the hybrid plug connector 402 and hybrid plug sleeve 404 to protrude outwards of the power converter 10. However, since the hybrid plug fixing rack 405 is fixed on the power converter 10, the hybrid plug gear 406 continuously moving downward will have a rolling action along the hybrid plug fixing rack 405. In this process, since the hybrid plug gear 406 moves down synchronously with the hybrid plug bracket 407, the hybrid plug bracket 407 drives the hybrid plug ground wire fixing guide 611, the hybrid plug live wire pin 408, the hybrid plug live wire guide 409, the hybrid plug neutral wire pin 410 and the hybrid plug neutral wire guide 411 to move down continuously, so that the hybrid plug neutral wire pin 410 and the hybrid plug live wire pin 408 protrude out of the power converter. The hybrid plug live wire guide 409 is inserted into the hybrid plug live wire clamping portion 6351, the hybrid plug neutral wire guide 411 is inserted into the hybrid plug neutral wire clamping portion 6241, and the hybrid plug ground wire fixing guide 611 is inserted into the hybrid plug ground wire clamping portion 6111, so as to realize the electrical connection between the hybrid plug assembly 40 of the type CEE7/7 and the plug-in and installed multi-country standard socket, and complete the conversion of pins, so as to facilitate the use of people's travel.

Figure 19:
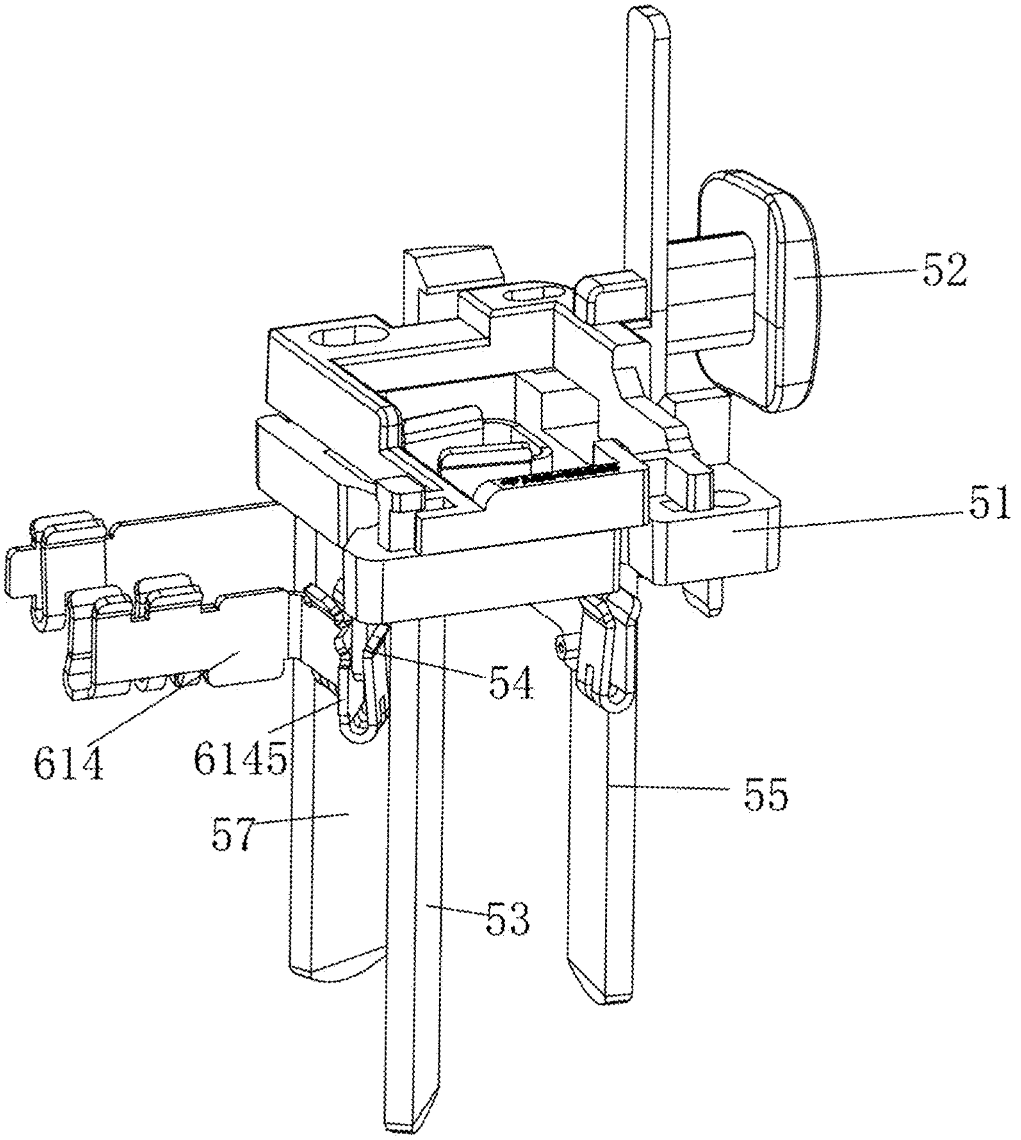
FIG. 19 is another use state view of the CN-standard or the AU-standard pin assembly.

When it is required to convert the inserted multi-country standard socket into a UK-standard pin, as shown in FIG. 19, an external force is applied to a key of the pin key piece 52, so that the CN-standard or AU-standard pin key piece 52 pushes the UK-standard pin connector 51, the CN-standard or AU-standard ground wire pin 53, the CN-standard or AU-standard ground wire guide 54, the CN-standard or AU-standard neutral wire pin 55, the CN-standard or AU-standard neutral wire guide 56, the CN-standard or AU-standard live wire pin 57, the CN-standard or AU-standard live guide 58 and other components thereon together to be pushed out. At this time, the CN-standard or AU-standard ground wire pin 53, the CN-standard or AU-standard neutral wire pin 55 and the CN-standard or AU-standard live wire pin 57 protrude out of the power converter 10. The CN-standard or AU-standard ground wire guide 54 is correspondingly inserted into the CN-standard or AU-standard ground wire clamping portion 6145, the CN-standard or AU-standard neutral wire guide 56 is correspondingly inserted into the CN-standard or AU-standard neutral wire clamping portion 6235, and the CN-standard or AU-standard live wire guide 58 is correspondingly inserted into the CN-standard or AU-standard live wire clamping portion 6344, so that the CN-standard or AU-standard pin assembly 50 is electrically connected with the plug-in and installed multi-country standard socket, and the pin conversion is completed, which is convenient for people to use.

It should be noted herein that the conduction structure for the power converter disclosed in the present utility model improves the specific structure, but the specific control mode is not an innovative point of the present utility model. With regard to the pin, the socket and other components involved in the present utility model, they can be common standard components or components known to a person skilled in the art. The structure, principle and control method thereof are all known to a person skilled in the art by a technical manual or through conventional experimental methods.

In the description above, only the preferred embodiments of the present utility model has been described, and the technical scope of the present utility model is not limited in any way. Therefore, other structures obtained by adopting the same or similar technical features as those of the above embodiments of the present utility model are within the scope of the present utility model.

The invention claimed is:

1. A conversion and conduction structure for a power converter, characterized by comprising:

a power converter comprising an upper cover of a main body, a lower cover of the main body covered with the upper cover of the main body, a bracket disposed inside the upper cover of the main body, a UK-standard pin assembly disposed between the lower cover of the main body and the upper cover of the main body, a US-standard pin assembly, a hybrid plug assembly of a type CEE7/7, and a CN-standard or an AU-standard pin assembly; a socket hole is disposed on the upper cover of the main body; wherein the power converter further comprises a conduction mechanism disposed on the bracket and extending downwards to respectively match the UK-standard pin assembly, the US-standard pin assembly, the hybrid plug assembly of the type CEE7/7, and the CN-standard or AU-standard pin assembly, wherein the conduction mechanism comprises a ground wire (PE) conduction assembly disposed on the bracket and matching the socket hole, a neutral wire (N) conduction assembly disposed on a side of the bracket and matching the socket hole, and a live wire (L) conduction assembly disposed on a side of the bracket and matching the socket hole;

the ground wire (PE) conduction assembly comprises a socket ground wire guide on the bracket, wherein the socket ground wire guide comprises an UK-standard insertion-hole ground wire clamping portion, a CN-standard or an AU-standard insertion-hole ground wire clamping portion and a US-standard insertion-hole ground wire clamping portion;

the live wire (L) conduction assembly comprises a socket live wire guide on a side of the bracket; the socket live wire guide comprises a US-standard insertion-hole live wire conduction piece, a second live wire substrate, an UK-standard insertion-hole live wire conduction piece, and a CN-standard or an AU-standard insertion-hole live wire conduction piece;

the neutral wire (N) conduction assembly comprises a socket neutral wire guide arranged on the other side of the bracket, wherein the socket neutral wire guide comprises a US-standard insertion-hole neutral wire guide, a UK-standard insertion-hole neutral wire guide and a CN-standard or an AU-standard insertion-hole neutral wire conduction piece.

2. The conversion and conduction structure for the power converter according to claim 1, characterized in that the US-standard pin assembly comprises a US-standard connector, a US-standard key piece connected to the US-standard connector, a US-standard ground wire pin installed in the US-standard connector and extending downwards, a US-standard ground wire guide disposed at the top of the US-standard ground wire pin and extending downwards in a bending manner, a US-standard neutral wire pin disposed in the US-standard connector and extending downwards, a US-standard neutral wire guide disposed at the top of the US-standard neutral wire pin and extending downwards in a bending manner, a US-standard live wire pin disposed in the US-standard connector and extending downwards, and a US-standard live wire guide disposed at the top of the US-standard live wire pin and extending downwards in a bending manner; the UK-standard pin assembly comprises a UK-standard connector, a UK-standard key piece connected to the UK-standard connector, a UK-standard ground wire pin installed in the UK-standard connector and extending downwards, a UK-standard ground wire guide disposed at the top of the UK-standard ground wire pin and extending downwards in a bending manner, a UK-standard neutral wire pin disposed in the UK-standard connector and extending downwards in a bending manner, a UK-standard neutral wire guide disposed at the top of the UK-standard neutral wire pin and extending downwards in a bending manner, a UK-standard neutral wire guide disposed in the UK-standard connector and extending downwards in a bending manner, and an UK-standard live wire guide disposed at the top of the UK-standard live wire pin and extending downwards in a bending manner; the hybrid plug assembly of the type CEE7/7 comprises a hybrid plug connector, a hybrid plug key piece connected to the hybrid plug connector, a hybrid plug sleeve linked with the hybrid plug key piece, and a hybrid plug bracket disposed to match the hybrid plug connector, wherein the hybrid plug bracket comprises a hybrid plug live wire pin extending downwards, a hybrid plug live wire guide disposed at the top of the hybrid plug live wire pin and extending downwards in a bending manner, a hybrid plug neutral wire pin disposed at the other side of the hybrid plug and extending downwards, a hybrid plug neutral wire guide disposed at the top of the hybrid plug neutral wire pin and extending downwards, and a hybrid plug ground wire guide with one end sheathed in the hybrid plug sleeve; and the CN-standard or AU-standard pin assembly comprises a CN-standard or an AU-standard connector, a CN-standard or an AU-standard key piece connected to the CN-standard or AU-standard connector, a CN-standard or an AU-standard ground wire pin installed in the CN-standard or AU-standard connector and extending downwards, a CN-standard or an AU-standard ground guide disposed at the top of the CN-standard or AU-standard ground wire pin and extending downwards, a CN-standard or an AU-standard neutral wire pin disposed in the CN-standard or AU-standard connector and extending downwards, a CN-standard or an AU-standard neutral wire guide disposed at the top of the CN-standard or AU-standard neutral wire pin and extending downwards in a bending manner, a CN-standard or an AU-standard live wire pin disposed in the CN-standard or AU-standard connector and extending downwards, and a CN-standard or an AU-standard live wire guide disposed at the top of the CN-standard or AU-standard live wire pin and extending downwards in a bending manner.

3. The conversion and conduction structure for the power converter according to claim 2, characterized in that the ground wire (PE) conduction assembly further comprises a ground wire lower connecting guide at one end of the socket ground wire guide, a pin ground wire fixing guide with one end connected to a tail end of the ground wire lower connecting guide and extending in a bending manner, and a hybrid plug ground wire fixing guide with one end bent and extended in the direction of the lower cover of the main body; and a hybrid plug ground wire clamping portion is formed at one end of the hybrid plug ground wire fixing guide close to the lower cover of the main body, and the hybrid plug ground wire guide is correspondingly inserted into the hybrid plug ground wire clamping portion.

4. The conversion and conduction structure for the power converter according to claim 3, characterized in that the pin ground wire fixing guide comprises a ground wire connecting and clamping portion for clamping the tail end of the ground wire lower connecting guide, a US-standard ground wire clamping portion disposed on one side of the ground wire connecting and clamping portion and clamping the US-standard ground wire guide, a pin ground wire connecting piece disposed on the other side of the US-standard ground wire clamping portion, a UK-standard ground wire clamping portion disposed on one side of the pin ground wire connecting and clamping portion and clamping the UK-standard ground wire guide, and a CN-standard or an AU-standard ground wire clamping portion disposed on one side of the UK-standard ground wire clamping portion and clamping the CN-standard or AU-standard ground wire guide.

5. The conversion and conduction structure for the power converter according to claim 2, characterized in that the neutral wire (N) conduction assembly further comprises a socket neutral wire guide disposed at one side of the bracket, and a neutral wire lower connecting piece integrally perpendicular to the lower cover of the main body and connected to the socket neutral wire guide.

6. The conversion and conduction structure for the power converter according to claim 5, characterized in that the pin neutral wire fixing guide comprises an US-standard neutral wire clamping portion capable of clamping the US-standard neutral wire guide, an UK-standard neutral wire clamping portion capable of clamping the UK-standard neutral wire guide, a CN-standard or an AU-standard neutral wire clamping portion capable of clamping the CN-standard or AU-standard neutral wire guide, and a hybrid plug neutral wire clamping portion capable of clamping the hybrid plug neutral wire guide.

7. The conversion and conduction structure for the power converter according to claim 2, characterized in that the live wire (L) conduction assembly comprises a fuse tube disposed on the lower cover of the main body, a live wire lower connecting piece with the top end connected to the socket live wire guide and the tail end conducting with the fuse tube, and a pin live wire fixing guide conducting with the lower end of the fuse tube, and one side of the pin live wire fixing guide has a hybrid plug live wire fixing guide extending to the side edge of the hybrid plug sleeve facing towards the hybrid plug live wire guide.

8. The conversion and conduction structure for the power converter according to claim 7, characterized in that the pin live wire fixing guide comprises a fuse tube clamping portion for clamping the tail end of the fuse tube, an UK-standard live wire clamping portion extending in the direction of the hybrid plug assembly of the type CEE7/7 and capable of clamping the UK-standard live wire guide, a live wire extension piece connected to the fuse tube clamping portion, a CN-standard or an AU-standard live wire clamping portion disposed on the live wire extension piece and capable of clamping the CN-standard or AU-standard live wire guide, and a US-standard live wire clamping portion capable of clamping the US-standard live wire guide; and the hybrid plug live wire fixing guide is arranged at one end of the pin live wire fixing guide close to an UK-standard live wire clamping portion, and the hybrid plug live wire fixing guide close to one end of the hybrid plug assembly of the type CEE7/7 is formed with a hybrid plug live wire clamping portion capable of clamping the hybrid plug live wire guide.

* * * * *